United States Patent
Kuriki et al.

(10) Patent No.: US 10,175,009 B2
(45) Date of Patent: Jan. 8, 2019

(54) METHOD FOR MANUFACTURING REFRIGERANT DISTRIBUTOR, REFRIGERANT DISTRIBUTOR MANUFACTURING APPARATUS, REFRIGERANT DISTRIBUTOR, HEAT EXCHANGER, AND AIR-CONDITIONING DEVICE

(71) Applicant: Mitsubishi Electric Corporation, Chiyoda-ku (JP)

(72) Inventors: Hironori Kuriki, Chiyoda-ku (JP); Kazuhiro Miya, Chiyoda-ku (JP); Nobuaki Miyake, Chiyoda-ku (JP); Akio Murata, Chiyoda-ku (JP); Yoshihiko Satake, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/533,683

(22) PCT Filed: Nov. 18, 2015

(86) PCT No.: PCT/JP2015/082408
§ 371 (c)(1),
(2) Date: Jun. 7, 2017

(87) PCT Pub. No.: WO2016/111089
PCT Pub. Date: Jul. 14, 2016

(65) Prior Publication Data
US 2017/0363376 A1  Dec. 21, 2017

(30) Foreign Application Priority Data
Jan. 7, 2015 (JP) .................. 2015-001784

(51) Int. Cl.
F28F 13/18 (2006.01)
F28F 19/06 (2006.01)
(Continued)

(52) U.S. Cl.
CPC ............ *F28F 19/06* (2013.01); *B23K 1/0012* (2013.01); *B23K 1/20* (2013.01); *B23K 35/00* (2013.01);
(Continued)

(58) Field of Classification Search
CPC ...... F25B 13/00; F25B 41/00; B23K 35/0227; B23K 1/0012; F28F 19/06; B23P 15/26
(Continued)

(56) References Cited

U.S. PATENT DOCUMENTS

| 5,251,374 | A | * | 10/1993 | Halstead | B23K 1/0012 228/183 |
| 5,418,072 | A | * | 5/1995 | Baldantoni | B23K 35/0227 428/545 |
| 2005/0160763 | A1 | * | 7/2005 | Choi | F25B 13/00 62/513 |

FOREIGN PATENT DOCUMENTS

| JP | 4-15496 A | 1/1992 |
| JP | 7-278779 A | 10/1995 |
| JP | 2012-13289 A | 1/2012 |

OTHER PUBLICATIONS

International Search Report dated Feb. 2, 2016 in PCT/JP2015/082408 filed Nov. 18, 2015.

* cited by examiner

*Primary Examiner* — Davis Hwu
(74) *Attorney, Agent, or Firm* — Oblon, McClelland, Maier & Neustadt, L.L.P.

(57) ABSTRACT

A sacrifice positive electrode layer is formed conveniently, efficiently, and accurately on the surface of a refrigerant
(Continued)

distributor having a complicated shape. Further, during the formation of the sacrifice positive electrode layer, the strength in the surroundings of joined parts is prevented from being lowered by excessive heating. Included are: an applying step of applying flux to remove an aluminum oxide to a surface of a plurality of outflow sections and a distributing section; an alloy disposing step of disposing a zinc-containing aluminum-silicon alloy on the surface to which the flux is applied; a forming step of forming the sacrifice positive electrode layer on the surface by heating the disposed zinc-containing aluminum-silicon alloy; a brazing material disposing step of inserting a plurality of outflow pipes into the plurality of outflow sections, respectively, and disposing an aluminum-silicon alloy brazing material on the surface of the outflow sections; and a brazing step of brazing the plurality of outflow sections with the plurality of outflow pipes, respectively, by heating the aluminum-silicon alloy brazing material.

13 Claims, 8 Drawing Sheets

(51) Int. Cl.
| | | |
|---|---|---|
| *F25B 41/00* | (2006.01) | |
| *B23P 15/26* | (2006.01) | |
| *B23K 1/00* | (2006.01) | |
| *B23K 1/20* | (2006.01) | |
| *B23K 35/00* | (2006.01) | |
| *F28F 9/02* | (2006.01) | |
| *B23K 101/14* | (2006.01) | |
| *B23K 101/34* | (2006.01) | |
| *B23K 103/10* | (2006.01) | |

(52) U.S. Cl.
CPC .............. *B23P 15/26* (2013.01); *F25B 41/00* (2013.01); *F28F 9/0246* (2013.01); *F28F 9/0275* (2013.01); *B23K 2101/14* (2018.08); *B23K 2101/35* (2018.08); *B23K 2103/10* (2018.08); *F28F 2275/045* (2013.01)

(58) Field of Classification Search
USPC ......................................................... 165/133
See application file for complete search history.

METHOD FOR MANUFACTURING REFRIGERANT DISTRIBUTOR, REFRIGERANT DISTRIBUTOR MANUFACTURING APPARATUS, REFRIGERANT DISTRIBUTOR, HEAT EXCHANGER, AND AIR-CONDITIONING DEVICE

TECHNICAL FIELD

The present invention relates to a method for manufacturing a refrigerant distributor having an anti-corrosion treatment applied to the surface thereof, a refrigerant distributor manufacturing apparatus, a refrigerant distributor, and a heat exchanger and an air-conditioning apparatus including the refrigerant distributor.

BACKGROUND ART

A refrigerant distributor is needed at an inlet of a heat exchanger configured to operate as a condenser or an evaporator of a refrigeration cycle device, in order to separate the refrigerant into multiple paths when such a heat exchanger has a divided, multiple refrigerant paths inside. The refrigeration cycle device may be an air-conditioning apparatus, or a refrigerating device.
Air-Conditioning Apparatus.

Further, for example, for a multi-type air-conditioning apparatus in which a plurality of outdoor units and/or indoor units are connected in parallel, a refrigerant distributor is needed for distributing refrigerant to each of the units from a main refrigerant passage.

When a heat transfer tube of the heat exchanger is made of aluminum, an aluminum material processed by shaving or other processing is used for a member of a distributing section of the refrigerant distributor. Further, outflow pipes and an inflow pipe connected to the distributing section are also each configured by using an aluminum material. To join the outflow pipes with the distributing section and to join the inflow pipe with the distributing section, a joining process involving a brazing process is commonly used due to complicated shapes of these joined members. To perform the brazing process, an aluminum brazing material configured with an alloy of aluminum and silicon is used as a brazing material. Further, the members are joined together by alloying the aluminum brazing material with the outflow pipes, the distributing section, and the inflow pipe each by performing a heating process with the use of a burner or other devices. Accordingly, the outflow pipes, the refrigerant distributor, the inflow pipe, and the brazed parts are all structured with either aluminum metal or an aluminum alloy.

The refrigerant distributor, the heat exchanger, and the air-conditioning apparatus configured by using aluminum metal are installed in an outdoor environment and are therefore prone to have chloride ions adhered to the surface thereof, the chloride ions being derived from sea salt grains transported in the outside air. The adhesion of the chloride ions locally destructs an aluminum oxide film being formed on the surface of the aluminum and having corrosion resistance. A local corrosion is thus developed starting with the destruction location. When the local corrosion keeps being developed, a through hole may be formed, as a result, through which the refrigerant can leak. Consequently, the devices may reach the end of the product life earlier than expected.

To inhibit the development of the local corrosion, a method is effective that forms a "sacrifice positive electrode layer" being a material that is electrochemically less noble (more unstable) than aluminum on the surface of the aluminum metal, so that the sacrifice positive electrode layer is corroded first preferentially. To form such a sacrifice positive electrode layer (material) for aluminum, an aluminum-zinc alloy obtained by mixing zinc with aluminum is commonly used. Generally-known examples of an aluminum material having a sacrifice positive electrode layer formed thereon obtained by forming such a sacrifice positive electrode layer on the surface of aluminum include "a zinc-sprayed aluminum material", and "an aluminum clad material having a sacrifice positive electrode layer formed thereon", among others. The zinc-sprayed aluminum material is obtained by forming an aluminum-zinc alloy by spraying melted metal zinc onto the surface and subsequently performing a heating process to cause the metal zinc on the surface to diffuse to the inside (see Patent Literature 1, for example). The aluminum clad material having a sacrifice positive electrode layer formed thereon is obtained by putting an aluminum-zinc alloy material together with an aluminum material and further performing a rolling and pressure-welding process thereon at high temperature.

CITATION LIST

Patent Literature

Patent Literature 1: Japanese Unexamined Patent Application Publication No. 4-15496

SUMMARY OF INVENTION

Technical Problem

As explained above, to form the sacrifice positive electrode layer that is effective in inhibiting the local corrosion of aluminum refrigerant pipes in heat exchangers, pipes that have conventionally been used include a "zinc-sprayed aluminum pipe" which is obtained by thermally spraying zinc on a circular aluminum pipe or on a flat-shaped heat transfer tube (which hereinafter will be referred to as "flat tube") of which the cross-sectional shape is flat and which has a flat section in the outline thereof and has a plurality of refrigerant passages on the inside thereof. Another conventional example is "a circular aluminum clad pipe having a sacrifice positive electrode layer formed thereon" obtained by cladding together a circular aluminum-zinc alloy pipe with a circular aluminum pipe.

Further, the abovementioned refrigerant distributor is formed to have a complicated shape having a plurality of branches, instead of a simple shape such as a uniform circular or rectangular column, because the plurality of outflow pipes and the distributing section are brazed and joined together, and also, the inflow pipe and the distributing section are brazed and joined together. Due to the complicated shape of the aluminum refrigerant distributor, it is considered difficult to form, as the sacrifice positive electrode layer on the surface of the aluminum refrigerant distributor, an aluminum clad material having the sacrifice positive electrode layer formed thereon by putting an aluminum-zinc alloy and an aluminum alloy together in advance.

Consequently, to form the sacrifice positive electrode layer on the refrigerant distributor having a complicated shape, it is necessary to thermally spray zinc onto the shaped refrigerant distributor so that the zinc diffuses on the surface. In that situation, to thermally spray the zinc onto an arbitrary region of the refrigerant distributor and cause the zinc to diffuse toward the inside of the core material, it is necessary to install a nozzle capable of spraying melted zinc onto a desired region. To form a zinc-sprayed region on a refrigerant distributor having a plurality of branches, the number of installed nozzles and the method for arranging the nozzles with respect to the refrigerant distributor become more complicated, as the number of zinc-sprayed regions increases, which makes it difficult to form the sacrifice positive electrode layer.

Further, when a pipe is joined with the refrigerant distributor, a brazing material is placed between the pipe and the refrigerant distributor, to perform a brazing process by applying heat up to a temperature close to 600 degrees C. When heating process is excessive during the heating process, a phenomenon called "erosion" occurs, where the melted brazing material erodes toward the inside of the core material, and the strength of the core material is thus lowered. When such erosion has occurred in a brazed part, the strength thereof is lowered during the manufacture of the refrigerant distributor, which may further lead to destruction starting in the strength-lowered part.

To overcome the problems described above, it is an object of the present invention to provide a refrigerant distributor manufacturing method, a refrigerant distributor manufacturing apparatus, a refrigerant distributor, a heat exchanger, and an air-conditioning apparatus, by which and with which it is possible to form a sacrifice positive electrode layer conveniently, efficiently, and accurately, on the surface of the refrigerant distributor having a complicated shape. Further, it is an object of the present invention to provide a method for manufacturing a refrigerant distributor, a refrigerant distributor manufacturing apparatus, a refrigerant distributor, a heat exchanger, and an air-conditioning apparatus, by which and with which it is possible to inhibit the strength in the surroundings of joined parts from being lowered by excessive heating during the formation of the sacrifice positive electrode layer.

Solution to Problem

A refrigerant distributor manufacturing method of an embodiment of the present invention is method for manufacturing a refrigerant distributor, the refrigerant distributor including an inflow section made of aluminum, into which refrigerant enters from an inflow pipe, a plurality of outflow pipes each of which is made of aluminum and each of which allows the entering refrigerant to flow out therethrough, and a distributing section made of aluminum, the distributing section including a plurality of outflow sections each being connected to one of the plurality of outflow pipes, the method comprising: an applying step of applying flux that removes aluminum oxide to a surface of the plurality of outflow sections and the distributing section; an alloy disposing step of disposing a zinc-containing aluminum-silicon alloy on the surface to which the flux is applied; a forming step of forming a sacrifice positive electrode layer on the surface by heating the disposed zinc-containing aluminum-silicon alloy; a brazing material disposing step of inserting the plurality of outflow pipes into the plurality of outflow sections, respectively, and disposing aluminum-silicon alloy brazing material on the surface of the outflow sections; and a brazing step of brazing the plurality of outflow sections with the plurality of outflow pipes, respectively, by heating the disposed aluminum-silicon alloy brazing material.

A refrigerant distributor manufacturing apparatus of an embodiment of the present invention is a refrigerant distributor manufacturing apparatus configured to manufacture a refrigerant distributor including an inflow section made of aluminum into which refrigerant enters from an inflow pipe, a plurality of outflow pipes each of which is made of aluminum and each of which allows the entering refrigerant to flow out, and a distributing section that is made of aluminum, and that includes a plurality of outflow sections each being connected to one of the plurality of outflow pipes, the refrigerant distributor manufacturing apparatus comprising: an applying unit configured to apply flux that removes aluminum oxide to a surface of the plurality of outflow sections and the distributing section; an alloy disposing unit configured to dispose a zinc-containing aluminum-silicon alloy on the surface to which the flux is applied by the applying unit; an inserting unit configured to insert the plurality of outflow pipes into the plurality of outflow sections, respectively; a brazing material disposing unit configured to dispose an aluminum-silicon alloy brazing material at the plurality of outflow sections into which the plurality of outflow pipes are inserted, respectively, by the inserting unit; and a heating unit configured to perform a forming step of forming a sacrifice positive electrode layer on the surface by heating the zinc-containing aluminum-silicon alloy disposed by the alloy disposing unit and a brazing step of brazing the plurality of outflow sections with the plurality of outflow pipes, respectively, by heating the aluminum-silicon alloy brazing material disposed by the brazing material disposing unit.

A refrigerant distributor of an embodiment of the present invention includes: an inflow section that is made of aluminum and into which refrigerant enters from an inflow pipe and; a plurality of outflow pipes each of which is made of aluminum and each of which allows the entering refrigerant to flow out; a distributing section that is made of aluminum and that includes a plurality of outflow sections each being connected to one of the plurality of outflow pipes; an aluminum-silicon alloy brazing material section in which the plurality of outflow pipes and the plurality of outflow sections are joined together; and a sacrifice positive electrode layer being formed on a surface of the plurality of outflow sections and the distributing section and having a zinc-containing aluminum-silicon alloy in which a concentration of zinc is higher than that in the aluminum-silicon alloy brazing material and which is electrochemically more unstable than the aluminum-silicon alloy brazing material.

A heat exchanger of an embodiment of the present invention includes: the refrigerant distributor; a plurality of heat transfer tubes extending from the refrigerant distributor; and a plurality of fins.

An air-conditioning apparatus of an embodiment of the present invention includes: a compressor; an outdoor heat exchanger; an electronic expansion valve; an indoor heat exchanger; and the refrigerant distributor. The refrigerant distributor distributes the refrigerant to a plurality of heat transfer tubes of the outdoor heat exchanger.

Advantageous Effects of Invention

By using the refrigerant distributor manufacturing method, the refrigerant distributor manufacturing apparatus, the refrigerant distributor, the heat exchanger, and the air-conditioning apparatus of an embodiment of the present invention, it is possible to form the sacrifice positive electrode layer conveniently, efficiently, and accurately on the surface of the refrigerant distributor having a complicated shape. Further, it is also possible to prevent the strength in the surroundings of the joined parts from being lowered by excessive heating during the formation of the sacrifice positive electrode layer.

DESCRIPTION OF EMBODIMENTS

Figure 1:
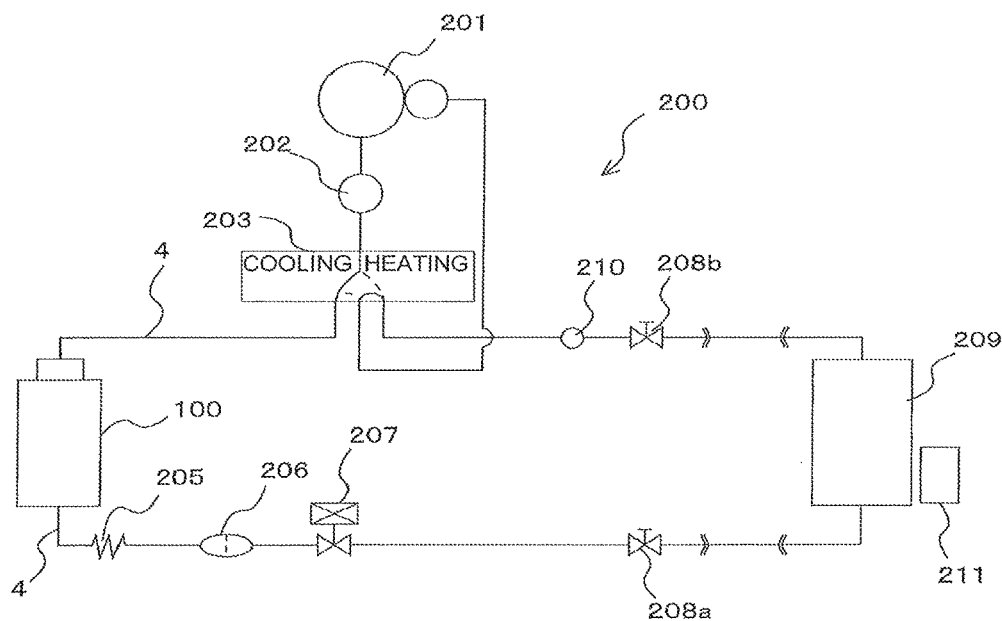
FIG. 1 is a refrigerant circuit diagram illustrating a schematic configuration of an air-conditioning apparatus according Embodiment 1 of the present invention.

Embodiments of the present invention will be described hereinafter. The modes illustrated in the drawings are merely examples and are not intended to limit the present invention. Further, some reference signs among the drawings indicate same or equivalent elements, which applies throughout the description of the present disclosure. Further, the dimensional relationships among the constituent elements illustrated in the drawings may differ from those in actual ones.

Embodiment 1

<A Configuration of an Air-Conditioning Apparatus>

FIG. 1 is a refrigerant circuit diagram illustrating a schematic configuration of an air-conditioning apparatus 200 according Embodiment 1 of the present invention. As illustrated in FIG. 1, the air-conditioning apparatus 200 includes a refrigerant circuit structured by connecting the following together with a refrigerant pipe 4: a compressor 201, a muffler 202, a four-way valve 203, an outdoor heat exchanger 100, a capillary pipe 205, a strainer 206, an electronic expansion valve 207, stop valves 208a and 208b, an indoor heat exchanger 209, and an auxiliary muffler 210.

An indoor unit that is for the air-conditioning apparatus 200 and that includes the indoor heat exchanger 209 is provided with a controller 211 configured to control actuators or the like of the compressor 201, the electronic expansion valve 207, and so on, based on temperatures of the outside air, the inside of the room, the refrigerant, and other factors. The four-way valve 203 is a valve configured to switch between refrigeration cycles of cooling and heating and is controlled by the controller 211.

Next, an example of an operation performed by the air-conditioning apparatus 200 during a cooling operation will be explained, with reference to FIG. 1. When the four-way valve 203 is switched to the cooling operation by the controller 211, the refrigerant is compressed by the compressor 201 to become gas refrigerant having high temperature and high pressure and to flow into the outdoor heat exchanger 100 via the four-way valve 203. The gas refrigerant having the high temperature and the high pressure and having flowed into the outdoor heat exchanger 100 exchanges heat with (transfers heat to) the outdoor air passing through the outdoor heat exchanger 100 and flows out as liquid refrigerant having high pressure. The liquid refrigerant having the high pressure and having flowed out of the outdoor heat exchanger 100 is depressurized by the capillary pipe 205 and the electronic expansion valve 207 to become gas-liquid, two-phase refrigerant having low pressure and to flow into the indoor heat exchanger 209. The gas-liquid, two-phase refrigerant having flowed into the indoor heat exchanger 209 exchanges heat with the indoor air passing through the indoor heat exchanger 209 to cool the indoor air, to become gas refrigerant having low temperature and low pressure, and to be sucked into the compressor 201.

Next, an example of an operation performed by the air-conditioning apparatus 200 during a heating operation will be explained, with reference to FIG. 1. When the four-way valve 203 is switched into the heating operation by the controller 211, the refrigerant is compressed by the compressor 201 to become gas refrigerant having high temperature and high pressure and to flow into the indoor heat exchanger 209 via the four-way valve 203, in a manner similar to that described above. The gas refrigerant having the high temperature and the high pressure and having flowed into the indoor heat exchanger 209 exchanges heat with the indoor air passing through the indoor heat exchanger 209 to heat the indoor air and to become liquid refrigerant having high pressure. The liquid refrigerant having the high pressure and having flowed out of the indoor heat exchanger 209 is depressurized by the electronic expansion valve 207 and the capillary pipe 205 to become gas-liquid, two-phase refrigerant having low pressure and to flow into the outdoor heat exchanger 100. The gas-liquid, two-phase refrigerant having flowed into the outdoor heat exchanger 100 exchanges heat with the outdoor air passing through the outdoor heat exchanger 100, to become gas refrigerant having low temperature and low pressure and to be sucked into the compressor 201.

<Configurations of the Heat Exchanger and the Refrigerant Distributor>

Figure 2:
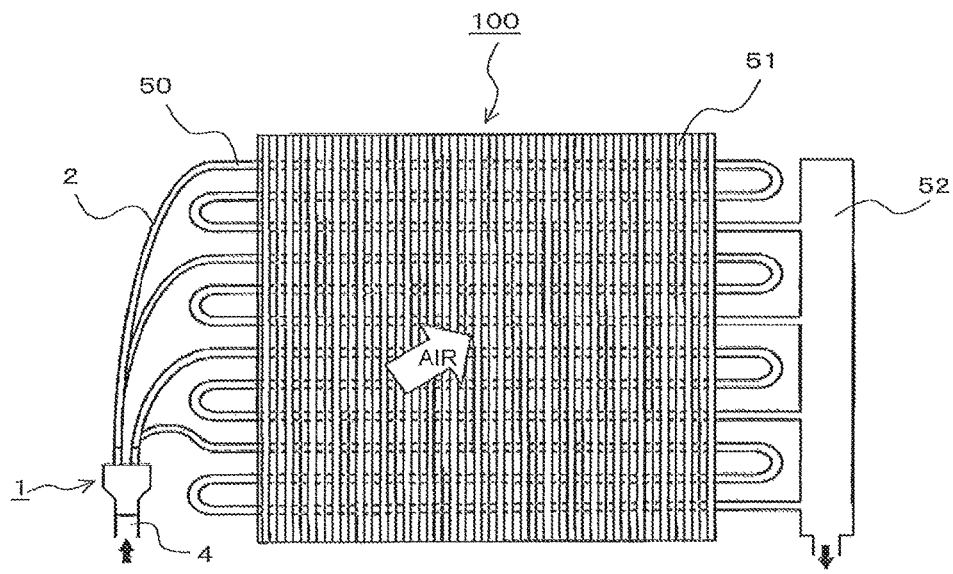
FIG. 2 is a schematic drawing illustrating a connection state of a refrigerant distributor and a heat exchanger according to Embodiment 1 of the present invention.

FIG. 2 is a schematic drawing illustrating a connection state of a refrigerant distributor 1 and a fin-tube-type heat exchanger (the outdoor heat exchanger 100) according to Embodiment 1 of the present invention. Outflow pipes 2 extending from the refrigerant distributor 1 to the fin-tube-type heat exchanger are connected, for example, to heat transfer tubes 50 provided for an outdoor unit or another element of the air-conditioning apparatus 200. For example, the refrigerant distributor 1 is configured to distribute two-phase refrigerant flowing into a fin-and-tube type heat exchanger comprising the heat transfer tubes 50 and a plurality of fins 51 that are arranged at spatial intervals while having the heat transfer tubes 50 inserted therethrough, when the heat exchanger functions as an evaporator. The heat transfer tubes 50 and the fins 51 are each configured by using either aluminum or an aluminum alloy. The heat transfer tubes 50 may be formed to have any shape, as a circular tube, a flat tube, or a tube having any other shape. The heat transfer tubes 50 are gather at a gas header 52.

Figure 3:
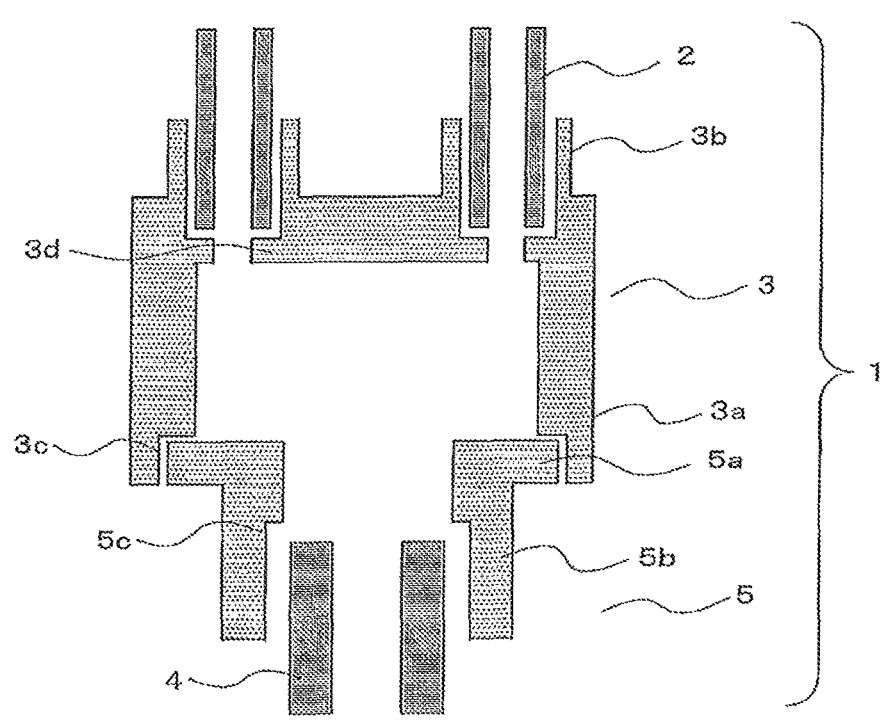
FIG. 3 is a schematic vertical cross-sectional view of the refrigerant distributor according to Embodiment 1 of the present invention.

FIG. 3 is a schematic vertical cross-sectional view of the refrigerant distributor 1 according to Embodiment 1 of the present invention. A configuration of the refrigerant distributor 1 will be explained, with reference to FIG. 3.

The refrigerant distributor 1 comprises an inflow section 5 made of aluminum and a distributing section 3 made of aluminum. The inflow section 5 is structured with an annular section 5a having a circular shape and a tubular section 5b having a diameter smaller than that of the annular section 5a and being coaxially arranged with the central axis of the annular section 5a. The refrigerant enters the inflow section 5 from the refrigerant pipe 4 serving as an inflow pipe. The distributing section 3 includes a main body section 3a having a tubular shape and being connected to the inflow section 5 and a plurality of outflow sections 3b each having a pipe-like shape and being provided to protrude from the main body section 3a. The distributing section 3 is integrally formed in such a manner that the plurality of outflow sections 3b are included in the main body section 3a. The distributing section 3 is configured to distribute the refrigerant that entered the distributing section 3 to the plurality of outflow pipes 2.

FIG. 3 illustrates gaps between the inflow section 5 and the refrigerant pipe 4, between the inflow section 5 and the distributing section 3, and between the outflow sections 3b and the outflow pipes 2 for the purpose of making it easy to understand the structure in view of filling of brazing materials.

The distributing section 3 is provided with a guide section 3d protruding in an annular shape in the direction to diametrically inside, to fix the positions of insertion ends of the outflow pipes 2 at a basal end of the outflow sections 3b. The guide section 3d has an opening diameter smaller than the diameter of each of the outflow sections 3b. The lower ends of the outflow pipes 2 are connected to the outflow sections 3b by being fitted from the inside thereof. Accordingly, when the outflow pipes 2 are fitted into the outflow sections 3b, the outflow pipes 2 are inserted into the outflow sections 3b, and the positions thereof are determined by causing the insertion ends of the outflow pipes 2 to abut against the guide section 3d.

As for the correlation between the thickness of each of the outflow pipes 2 and the width, in terms of the radial direction, of the guide section 3d provided beneath the outflow sections 3b, it is desirable to arrange the width of the guide section 3d to be equal to or smaller than the thickness of each of the outflow pipes 2, in order not to impede the flow of the refrigerant.

To manufacture the distributing section 3 including the outflow sections 3b and the guide section 3d as well as the inflow section 5, it is possible to perform a pressing molding process, a shaving molding process, or a casting process such as an aluminum die casting process that uses an aluminum alloy.

To join the distributing section 3 with the inflow section 5, the outer circumference of the annular section 5a of the inflow section 5 is fitted to a cut-out section 3c having a circular shape with a diameter larger than other portions to form a step and being formed on the circumferential surface at the lower end of the main body section 3a. Further, to join the refrigerant pipe 4 with the inflow section 5, the outer circumference of the tube-shaped refrigerant pipe 4 is fitted to a cut-out section 5c having a circular shape with a diameter larger than other portions to form a step and being formed on the inner circumferential surface at the lower end of the tubular section 5b of the inflow section 5.

After that, the distributing section 3 and the inflow section 5 are joined together by a brazing process. Further, the refrigerant pipe 4 and the inflow section 5 are brazed together, and also, the outflow pipes 2 and the outflow sections 3b are joined together by a brazing process.

Examples of brazing methods include a burner brazing method and a furnace brazing method. The burner brazing method is a joining method in which a brazing material is placed at a joined part by applying fluoride flux to the joined part, then the temperature of the brazing material is raised to the melting point of 590 degrees C. by using a burner, to perform a joining process by melting the brazing material. The gas burner may use city gas, propane gas, mixed gas of acetylene and oxygen, or other types of gas. The furnace brazing method is commonly called NOCOLOK brazing method and is a joining method in which, while using fluoride-based flux similarly to the burner brazing method, a brazing process is performed by introducing nitrogen gas into a furnace and controlling the temperature inside the furnace with a heater. Another furnace brazing method besides the NOCOLOK brazing method is a joining method called vacuum brazing method. The vacuum brazing method is a joining method by which a brazing process is performed while preventing reoxidation by keeping the inside of a furnace in a high vacuum state so that no oxygen is supplied thereto.

The NOCOLOK brazing method and the vacuum brazing method are brazing methods having high reliability because it is possible to perform the brazing processes while managing the temperature within the furnace.

<Forming a Sacrifice Positive Electrode Layer on the Surface of the Refrigerant Distributor>

An anti-corrosion treatment is applied to the surface of the refrigerant distributor 1 manufactured with the configuration as described above.

Although aluminum is originally an active metal, aluminum immediately reacts with oxygen in the environment to form an oxide film that provides protectivity on the surface thereof. Consequently, aluminum is considered to be a metal that is stable in dry air at room temperature and is highly corrosion resistant. When aluminum is in an environment to be exposed to the air, "pitting corrosion" may occur and a pit may be formed in which the oxide film formed on the surface is locally destructed. Once such pitting corrosion occurs, active aluminum on the inside of the oxide film is eroded. When aluminum is used for the refrigerant pipe 4 including the refrigerant distributor 1 of the air-conditioning apparatus 200 according to the present embodiment, it is necessary to apply an anti-corrosion treatment thereto to achieve an excellent product life, because once pitting corrosion occurs, it would be difficult to control or understand the development of the corrosion. As the anti-corrosion treatment, a "sacrifice positive electrode method" is adopted as described above by which the form of corrosion is controlled to change the development of corrosion from a local corrosion developing in a direction toward the core material into a comprehensive corrosion developing in a direction toward the surface layer, by forming, on the surface thereof, an aluminum-zinc alloy obtained by adding zinc to an aluminum alloy. In the present example, forming a sacrifice positive electrode layer on the surface of the refrigerant distributor 1 will be explained.

As a method for forming the sacrifice positive electrode layer on the surface of the refrigerant distributor 1, adopted is a brazing process that uses a zinc-containing aluminum-silicon alloy obtained by adding zinc to an aluminum-silicon alloy serving as a brazing material for an aluminum brazing process. This material is obtained by adding zinc to the aluminum-silicon alloy serving as a base material and has the characteristic where the melting point is lower than that of the base material. For example, the melting point of A4047 alloy (88 wt % aluminum/12 wt % silicon) that can be used as an aluminum-silicon alloy for a brazing process is 590 degrees C. In contrast, the melting point of metal zinc to be added is 420 degrees C. Thus, the melting point of the zinc-containing aluminum-silicon alloy according to the present embodiment approaches the melting point of the metal zinc in accordance with the addition amount of the metal zinc. In the present embodiment, the zinc-containing aluminum-silicon alloy used for forming the sacrifice positive electrode layer will be referred to as a zinc-containing aluminum-silicon alloy brazing material to be used for the brazing process, but does not necessarily have to be a brazing material.

To cause a brazing material to diffuse on the surface of an aluminum core material to be alloyed together, it is necessary to apply flux thereto which is a surface treatment agent. The flux has a function of ensuring wettability and fluidity of the brazing material on the surface, by removing an aluminum oxide formed on the surface of the aluminum and preventing an oxide film from being newly formed. Examples of the flux that can be used include chlorides and fluorides of alkali metals. In consideration of impacts on aluminum material corrosions caused by a residue after the brazing process, it is preferable to use a fluoride of an alkali metal such as potassium fluoroaluminate, e.g., $KAlF_4$ or $K_3AlF_6$.

The flux as explained above is applied to such a region of the refrigerant distributor 1 where the sacrifice positive electrode layer is to be formed, more specifically, where the thickness is small within the refrigerant distributor 1, i.e., on the surface and in the vicinity of the outflow sections 3b. By disposing the zinc-containing aluminum-silicon alloy in the surroundings thereof and performing a brazing process, the refrigerant distributor 1 having a sacrifice positive electrode layer formed thereon is obtained. In the present example, the region where the sacrifice positive electrode layer is to be formed is simply defined by disposing the zinc-containing aluminum-silicon alloy even when the refrigerant distributor 1 has a complicated shape. It is therefore possible to form the sacrifice positive electrode layer with an excellent level of precision. A material obtained by adding 10 wt % metal zinc to A4047 alloy was used as the zinc-containing aluminum-silicon alloy. As a fluoride of an alkali metal, potassium fluoroaluminate, which is configured with a fluoride of potassium and aluminum, was used. Further, not only the sacrifice positive electrode layer forming process, but also a process of brazing the refrigerant distributor 1 and the outflow pipes 2 together were performed at the same time. To braze the refrigerant distributor 1 and the outflow pipes 2 together, potassium fluoroaluminate was used as flux similarly to the example above, and A4047 alloy was used as a brazing material. After disposing the materials described above, the refrigerant distributor 1 and the outflow pipes 2 are brazed together by burner brazing (to braze the refrigerant distributor 1 and the outflow pipes 2 together by using the aluminum-silicon alloy brazing material), and, simultaneously therewith, the sacrifice positive electrode layer is formed (by disposing the zinc-containing aluminum-silicon alloy brazing material on the surface of the refrigerant distributor 1). In the brazing step, the zinc-containing aluminum-silicon alloy is melted first, and then the aluminum-silicon alloy is melted subsequently, due to the difference in the melting point between the brazing materials. The point in time when the aluminum-silicon alloy was melted for the process of brazing together the refrigerant distributor 1 and the outflow pipes 2 is considered to be the end point of the simultaneous brazing process. The brazing step in the present example also serves as a forming step of forming the sacrifice positive electrode layer.

Figure 4A:
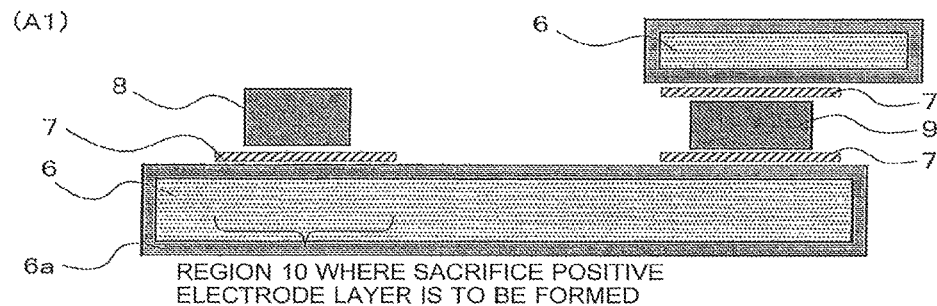
FIG. 4A is a schematic drawing that illustrates steps from the time when flux is applied to the time when an aluminum-silicon alloy is melted, together with a manner in which a sacrifice positive electrode layer diffuses, the steps being performed on the refrigerant distributor according to Embodiment 1 of the present invention.
Figure 4B:
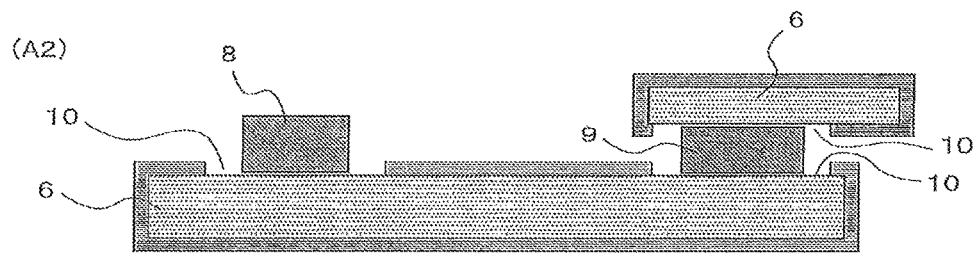
FIG. 4B is another schematic drawing that illustrates the steps from the time when the flux is applied to the time when the aluminum-silicon alloy is melted, together with the manner in which the sacrifice positive electrode layer diffuses, the steps being performed on the refrigerant distributor according to Embodiment 1 of the present invention.
Figure 4C:
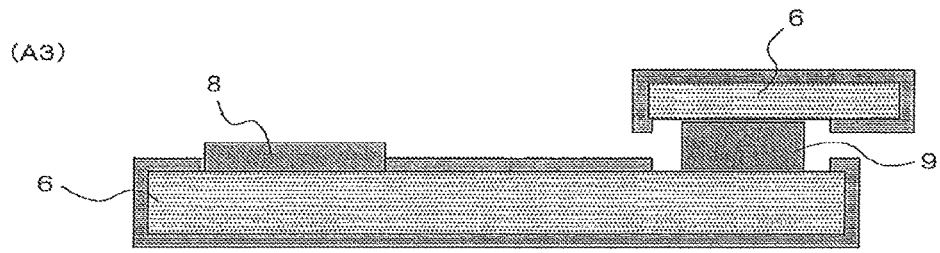
FIG. 4C is yet another schematic drawing that illustrates the steps from the time when the flux is applied to the time when the aluminum-silicon alloy is melted, together with the manner in which the sacrifice positive electrode layer diffuses, the steps being performed on the refrigerant distributor according to Embodiment 1 of the present invention.
Figure 4D:
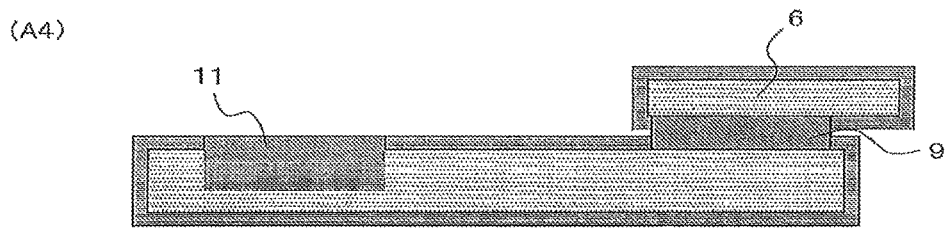
FIG. 4D is yet another schematic drawing that illustrates the steps from the time when the flux is applied to the time when the aluminum-silicon alloy is melted, together with the manner in which the sacrifice positive electrode layer diffuses, the steps being performed on the refrigerant distributor according to Embodiment 1 of the present invention.

FIG. 4A is a schematic drawing that illustrates steps from the time when the flux is applied to the time when the aluminum-silicon alloy is melted, together with a manner in which the sacrifice positive electrode layer 11 diffuses, the steps being performed on the refrigerant distributor 1 according to Embodiment 1 of the present invention. FIG. 4B is another schematic drawing that illustrates the steps from the time when the flux is applied to the time when the aluminum-silicon alloy is melted, together with the manner in which the sacrifice positive electrode layer 11 diffuses, the steps being performed on the refrigerant distributor 1 according to Embodiment 1 of the present invention. FIG. 4C is yet another schematic drawing that illustrates the steps from the time when the flux is applied to the time when the aluminum-silicon alloy is melted, together with the manner in which the sacrifice positive electrode layer 11 diffuses, the steps being performed on the refrigerant distributor 1 according to Embodiment 1 of the present invention. FIG. 4D is yet another schematic drawing that illustrates the steps from the time when the flux is applied to the time when the aluminum-silicon alloy is melted, together with the manner in which the sacrifice positive electrode layer 11 diffuses, the steps being performed on the refrigerant distributor 1 according to Embodiment 1 of the present invention. FIGS. 4A to 4D schematically illustrate the steps from the time when the flux is applied to the time when the aluminum-silicon alloy is melted (the end point of the brazing process), together with the manner in which the sacrifice positive electrode layer diffuses.

As illustrated in FIG. 4A, with respect to an aluminum material 6 and an oxide film 6a formed on the surface thereof, flux 7 is applied to a region 10 where the sacrifice positive electrode layer 11 is to be formed, and a zinc-containing aluminum-silicon alloy brazing material 8 is disposed in the vicinity thereof. Also, flux 7 is applied to locations where aluminum materials 6 are brazed with each other, and an aluminum-silicon alloy brazing material 9 is disposed in the vicinity thereof (step A1).

As illustrated in FIG. 4B, in the region 10 to which the flux 7 has been applied, the oxide film 6a formed on the surface of the aluminum material is removed, so that the aluminum material 6 can come into contact with the zinc-containing aluminum-silicon alloy brazing material 8 and so that the aluminum material 6 can come into contact with the aluminum-silicon alloy brazing material 9 (step A2).

As illustrated in FIG. 4C, when a heating process is performed in an inert gas atmosphere of nitrogen or other types of gas, while the materials are able to come into contact with each other, the zinc-containing aluminum-silicon alloy brazing material 8 is melted and alloyed with the aluminum material 6 (step A3).

As illustrated in FIG. 4D, when the heating process is continued, the aluminum-silicon alloy brazing material 9 having a melting point higher than that of the zinc-containing aluminum-silicon alloy brazing material is subsequently melted and alloyed with the aluminum material 6, and as a result, the aluminum materials 6 are brazed with each other. At the same time, in the part where the zinc-containing aluminum-silicon alloy brazing material 8 was melted and alloyed with the aluminum material 6 previously, it is possible to form the sacrifice positive electrode layer 11 because the alloyed zinc diffuses toward the aluminum material 6 side having a lower concentration level of zinc (step A4). The brazing process is ended at this point in time.

In the manner explained above, the refrigerant distributor 1 having the sacrifice positive electrode layer formed thereon was manufactured.

<A Brazed State of the Refrigerant Distributing Pipes Having the Sacrifice Positive Electrode Layer Formed Thereon>

Performance and other characteristics of the refrigerant distributor 1 manufactured in the manner described above were tested.

The brazing process is performed to form the sacrifice positive electrode layer 11 on the surface of the refrigerant distributor 1. By performing the brazing process, it is possible to form the sacrifice positive electrode layer 11 in an arbitrary region by disposing (applying) the zinc-containing aluminum-silicon alloy brazing material 8, without the need to use a zinc thermal spraying process or clad pipes. However, it is necessary to check the manner in which the sacrifice positive electrode layer 11 is formed. The following paragraphs describe how the manner in which the sacrifice positive electrode layer had been formed, after the brazing process is checked.

To check the formation of the sacrifice positive electrode layer 11 on the surface of the refrigerant distributor 1, it is effective to analyze components on a cross-sectional plane. A component analysis was performed by using an Electron Probe Micro Analyzer (EPMA) on a cross-sectional plane obtained by cutting out a brazed sample. The analysis was performed in two locations, namely, in the vicinity of the surface of the outflow sections 3b of the distributing section 3 where the sacrifice positive electrode layer 11 had been formed and the joined parts between the refrigerant distributor 1 and the outflow pipes 2.

As a result of observations and the component analysis (not illustrated), it was confirmed that, in the brazed part, the aluminum-silicon alloy was filled in without forming a gap between the outflow pipes 2 and the refrigerant distributor 1 and that silicon was uniformly distributed within the aluminum-silicon alloy. Further, no erosion of the aluminum-silicon alloy was observed, either on the refrigerant distributor 1 side or on the outflow pipes 2 side. It was therefore understood that the brazing material was properly disposed between the refrigerant distributor 1 and the outflow pipes 2 so that the base material and the brazing material were alloyed by the brazing process without any problem. Further, in the vicinity of the surface of the outflow sections 3b of the distributing section 3 where the sacrifice positive electrode layer 11 had been formed, it was observed, first of all, that an alloy layer including zinc, aluminum, and silicon was present on the surface of the outflow sections 3b and that the alloy layer eroded toward inside by approximately 10 μm to 20 μm from the surface layer of the outflow sections 3b.

As for the zinc element among others, it was observed that, in a large part of the alloy layer including zinc, aluminum, and silicon, the zinc was uniformly distributed while having a concentration of zinc of 7 wt % to 8 wt %. In the eroded part of the outflow sections 3b, it was learned that the concentration of zinc was gradually getting lower toward the interior thereof. When the sacrifice positive electrode layer 11 configured in this manner is used, it is expected that the zinc-aluminum-silicon alloy layer having the zinc concentration of 7 wt % to 8 wt % is corroded at first preferentially, and after the layer has disappeared, the zinc-aluminum-silicon alloy layer (the eroded part) having the thickness of 10 μm to 20 μm is sequentially corroded from the outer layer thereof toward the part having the lower concentration. It is expected that the development of the corrosion described above inhibits development of corrosion in the outflow sections 3b serving as a core material and in a core material part of the refrigerant distributor 1.

As explained above, by performing the component analysis on the cross-sectional plane of the sample, it was confirmed that the refrigerant distributor 1 and the outflow pipes 2 were properly joined together and that the sacrifice positive electrode layer 11 was properly formed on the surface of the refrigerant distributor 1, by applying the flux, disposing the brazing material, and performing the brazing process.

<A Corrosion Test on the Refrigerant Distributor Having the Sacrifice Positive Electrode Layer Formed Thereon>

Together with the confirmation of the formation of the sacrifice positive electrode layer 11 on the refrigerant distributor 1 having the sacrifice positive electrode layer formed thereon, it is necessary to check the function of the layer, i.e., anti-corrosion characteristics of the layer. In the present example, a corrosion test was performed on the manufactured refrigerant distributor 1 having the sacrifice positive electrode layer formed thereon, to verify that the anti-corrosion characteristics were ensured by evaluating the status of corrosion. The following describes details of the corrosion test that was performed and results of the test (the status of corrosion).

The refrigerant distributor 1 according to the present embodiment is applied to the outdoor unit or another element of the air-conditioning apparatus 200. It is therefore considered to be reasonable to assume, as for a cause of corrosion, that aluminum may be corroded by salt damage. A combined cycle test was performed by simulating corrosion caused by salt damage and by using salt water as a corrosion fluid to realize an acceleration test, to evaluate the status of corrosion.

The combined cycle test was performed for 1,000 hours by using a 5-wt % NaCl water solution as a liquid to be sprayed onto the refrigerant distributor 1 having the sacrifice positive electrode layer formed thereon according to the present embodiment, to evaluate the status of corrosion. As a result, from appearance, it was observed that white rust occurred in the region where the sacrifice positive electrode layer 11 was formed and that the surface of the aluminum base material in the vicinity thereof remained to be glossy. To further understand the status of corrosion in detail, a component analysis using EPMA was performed by embedding a corrosion sample in resin and observing a cut cross-sectional plane with the use of a metal microscope. With respect to the cross-sectional plane of the corrosion sample, it was confirmed from the result of the observation using the metal microscope that the corrosion was developing in the surface layer. As a result of a component analysis performed to investigate the region where the corrosion was developing, it was confirmed that the corrosion was developing in the surface layer of the zinc-aluminum-silicon alloy layer. Further, as for the aluminum core material layer, it was confirmed that an oxide having a small thickness (on the order of submicrometer) was formed on the surface layer. From these results, it was confirmed that corrosion of the aluminum core material layer was inhibited by the corrosion developing in the sacrifice positive electrode layer 11 formed by the brazing process.

As explained above, for the refrigerant distributor 1 having the sacrifice positive electrode layer formed thereon according to the present embodiment, the sacrifice positive electrode layer 11 is formed on the surface by using the zinc-containing aluminum-silicon alloy brazing material 8. As a result, it is possible to form the sacrifice positive electrode layer 11 conveniently, efficiently, and accurately, on the surface of the refrigerant distributor 1 having a complicated shape. Further, it is possible to prevent the strength in the surroundings of the joined parts from being lowered by excessive heating during the formation of the sacrifice positive electrode layer 11.

Further, the sacrifice positive electrode layer 11 is formed by applying the brazing-purpose flux 7 to the region on the surface of the refrigerant distributor 1 where the sacrifice positive electrode layer 11 is to be formed, disposing the zinc-containing aluminum-silicon alloy brazing material 8 in the vicinity of the flux-applied region, and performing the heating process on the zinc-containing aluminum-silicon alloy brazing material 8 and the surface of the refrigerant distributor 1. With this arrangement, it is possible to organize the order in which the steps of the flux applying step, the brazing material disposing step, and the heating process step are performed. It is therefore possible to form the sacrifice positive electrode layer 11 on the surface of the refrigerant distributor 1 conveniently, efficiently, and accurately.

For the refrigerant distributor 1, to join the refrigerant pipe 4 with the inflow section 5 of the refrigerant distributor 1 and to join the outflow pipes 2 with the outflow sections 3b of the refrigerant distributor 1, the brazing process is performed by using the aluminum-silicon alloy brazing material 9, to form the aluminum-silicon alloy brazing material section. In this configuration, the melting point of the zinc-containing aluminum-silicon alloy brazing material 8 forming the sacrifice positive electrode layer 11 is lower than the melting point of the aluminum-silicon alloy brazing material 9. Accordingly, it is possible to form the sacrifice positive electrode layer 11 by melting only the zinc-containing aluminum-silicon alloy brazing material 8. Consequently, it is possible to prevent the occurrence of re-melting, erosion, and other phenomena in the surroundings of the joined part between the refrigerant pipe 4 and the refrigerant distributor 1 and the joined part between the outflow pipes 2 and the refrigerant distributor 1, during the formation of the sacrifice positive electrode layer 11.

Embodiment 2

In the method for manufacturing the refrigerant distributor 1 according to Embodiment 1, at the same time as brazing the refrigerant distributor 1 and the outflow pipes 2 together, the sacrifice positive electrode layer 11 is also formed on the surface of the refrigerant distributor 1. However, in some situations, the sacrifice positive electrode layer 11 may be formed on the surface of the refrigerant distributor 1 in which, due to constraints in the manufacturing process, the outflow pipes 2 and the outflow sections 3b have already been joined together in advance by forming an aluminum-silicon alloy brazing material section through a brazing process. Because it is necessary to perform a brazing process to form the sacrifice positive electrode layer 11, there is a possibility that, due to excessive heating, re-melting, erosion, or other phenomena may occur in the surroundings of the joined parts including the connection part between the outflow pipes 2 and the refrigerant distributor 1. Further, when re-melting or erosion has occurred in the surrounding of the joined parts including the joined part between the outflow pipes 2 and the refrigerant distributor 1, there is a possibility that the strength may decrease in those parts, which may further lead to destruction in the strength-lowered parts. According to the present embodiment, a manufacturing procedure is specified to include a step of forming the sacrifice positive electrode layer 11 subsequent to a step of brazing and joining the refrigerant distributor 1 with the pipes.

To manufacture the refrigerant distributor 1 according to the present embodiment, a refrigerant distributor 1 is prepared that is already joined with the outflow pipes 2 by forming an aluminum-silicon alloy brazing material section through a brazing process. The flux 7 is applied to the outflow sections 3b of the refrigerant distributor 1 prepared in this manner, and the zinc-containing aluminum-silicon alloy brazing material 8 is disposed. The flux 7 and the zinc-containing aluminum-silicon alloy brazing material 8 are the same materials and have the same positional arrangements as those in Embodiment 1. A heating process was performed on these by a burner brazing, and the heating process was completed at the point in time when the zinc-containing aluminum-silicon alloy brazing material 8 was melted. In other words, the heating process was performed up to a temperature at which the aluminum-silicon alloy brazing material 9 was not melted, but only the zinc-containing aluminum-silicon alloy brazing material 8 was melted.

From a quick observation, no signs of degradation such as cracks were found in the joined parts of this sample. It is therefore indicated that the lowering of the strength is inhibited. Further, as a result of observing a cross-sectional plane of the joined parts of this sample by using a metal microscope, it was confirmed (not illustrated) that the sacrifice positive electrode layer 11 in which the zinc uniformly diffused was formed, while the zinc-aluminum-silicon alloy forming the joined parts was prevented from having coarser crystal particles, which could have been caused by excessive heating.

When crystal particles become coarser, it is anticipated that a stress concentration may occur at the grain boundary interface or that the strength may be lowered or the corrosion resistance may be lowered due to a segregation of silicon, zinc, or other elements at the grain boundary interface. However, when the refrigerant distributor 1 according to the present embodiment is used, because the melting point of the zinc-containing aluminum-silicon alloy forming the sacrifice positive electrode layer 11 is lower than the melting point of the aluminum alloy disposed in the surroundings of the joined parts of the refrigerant distributor 1, it is possible to stop the heating process before reaching the state of excessive heating. As a result, it is possible to inhibit the occurrence of excessive heating. It is also possible to prevent the strength in the joined parts from being lowered and to prevent the corrosion resistance from being lowered.

As explained above, for the refrigerant distributor 1 according to the present embodiment, the sacrifice positive electrode layer 11 is formed by using the zinc-containing aluminum-silicon alloy brazing material 8 on the surface of the refrigerant distributor 1 in which the brazing processes have already been performed to join the refrigerant pipe 4 with the inflow section 5 and to join the outflow pipes 2 with the outflow sections 3b. With this arrangement, the order of the manufacturing procedure in the surroundings of the joined parts is defined so that the sacrifice positive electrode layer 11 is formed after the joining process on the joined parts is performed. In that situation, the sacrifice positive electrode layer 11 is formed by performing the heating process up to a temperature at which the aluminum-silicon alloy brazing material 9 is not melted, but only the zinc-containing aluminum-silicon alloy brazing material 8 is melted. For this reason, it is possible to inhibit the occurrence of re-melting, erosion, and other phenomena in the surroundings of the brazed joined parts. Consequently, it is possible to inhibit the occurrence of re-melting, erosion, and other phenomena, and it is also possible to avoid destruction that may be started in the strength-lowered parts, because the lowering of the strength is prevented.

Embodiment 3

With the refrigerant distributor 1 according to Embodiment 2, it is confirmed that it is possible to inhibit the excessive heating, and also, it is possible to prevent the strength from being lowered and to prevent the corrosion resistance from being lowered in the surroundings of the joined parts of the sacrifice positive electrode layer 11, which may be caused by the excessive heating, by performing the heating process to form the sacrifice positive electrode layer 11 while controlling the temperature to be at such a level where the zinc-containing aluminum-silicon alloy brazing material 8 is melted. In this configuration, as explained above, the melting point is lowered due to the zinc added to the aluminum-silicon alloy used for forming the sacrifice positive electrode layer 11 and that it is possible to avoid performing excessive heating that may reach an excessively high temperature. As for the addition amount of the zinc, the larger the addition amount is, the lower becomes the melting point, and the easier it is to inhibit the excessive heating. However, at the same time, when the content amount of the zinc is larger, the corrosion speed of the material itself increases, i.e., the material is corroded more easily. It is therefore necessary to control the addition amount of the zinc to be in an optimal range. In the present example, to find the optimal range, impacts of the addition amount of the zinc that are made on thermodynamic characteristics and corrosion resistance of the zinc-containing aluminum-silicon alloy according to the present embodiment were studied.

As an aluminum-silicon alloy, A4047 containing 12 wt % silicon was prepared. Zinc-containing aluminum-silicon alloys were produced while using the concentration of the metal zinc to be added to A4047 alloy as a parameter.

Figure 5:
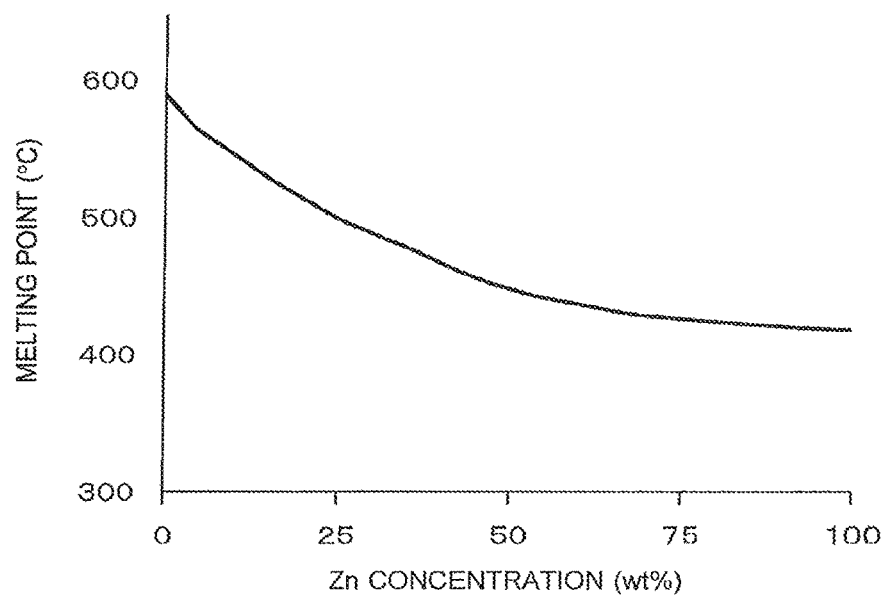
FIG. 5 is a chart illustrating dependence on concentration of zinc with respect to melting points of a zinc-containing aluminum-silicon alloy according to Embodiment 3 of the present invention.

FIG. 5 is a chart illustrating dependence on concentration of zinc with respect to melting points of the zinc-containing aluminum-silicon alloy according to Embodiment 3 of the present invention.

As illustrated in FIG. 5, it was observed that the melting point of the zinc-containing aluminum-silicon alloy decreased from 580 degrees C., which is the melting point of the aluminum-silicon alloy serving as the base material, toward 420 degrees C., which is the melting point of metal zinc, as the concentration of the zinc increased. It was also learned that the decreasing ratio became more gradual as the concentration of the zinc increased. Further, it was observed that, when the concentration of the zinc was lower than 5 wt %, there was hardly any difference (equal to or smaller than 20 degrees C.) between the melting point of the zinc-containing aluminum-silicon alloy and the melting point of the aluminum alloy. For the purpose of preventing the strength from being lowered by excessive heating in the surroundings of the joined parts during the formation of the sacrifice positive electrode layer 11, it is necessary to arrange the melting point of the zinc-containing aluminum-silicon alloy forming the sacrifice positive electrode layer 11 to be lower than the melting point of the aluminum-silicon alloy positioned in the surroundings of the joined parts. In other words, it was observed that it is necessary to keep the concentration of the zinc in the alloy at a predetermined level.

Further, because the zinc contained in the zinc-containing aluminum-silicon alloy has a function of weakening an oxide film formed on the surface of the aluminum alloy, the larger the addition amount of the zinc is, the higher is the speed of the corrosion. In the present example, impacts on the speed of corrosion made by the concentration of the zinc in the zinc-containing aluminum-silicon alloy were evaluated by performing an electrochemical measuring process. It is possible to derive a corrosion electric current by performing an oxidation/reduction current measuring process on an evaluated material and to convert the corrosion current into a corrosion speed.

Figure 6:
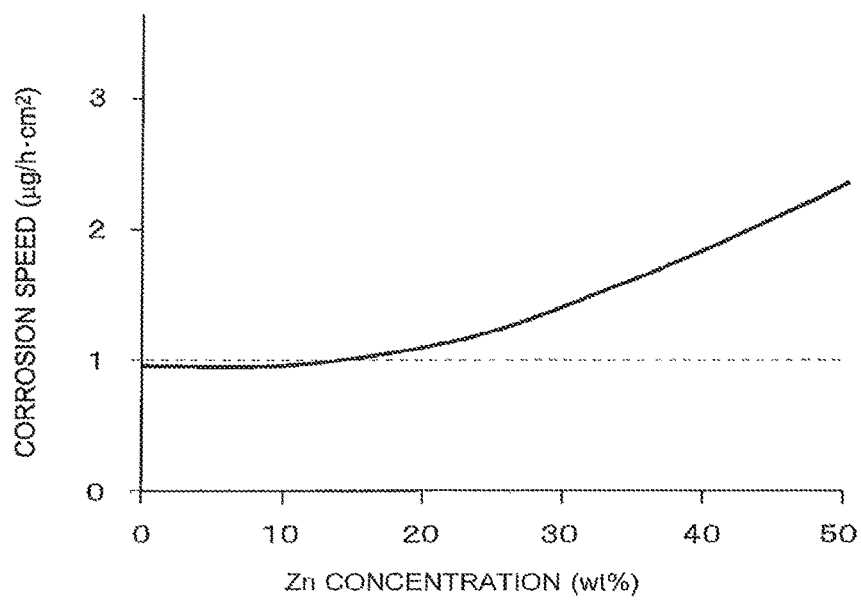
FIG. 6 is a chart illustrating dependence on concentration of zinc with respect to corrosion speeds of the zinc-containing aluminum-silicon alloy according to Embodiment 3 of the present invention.

FIG. 6 is a chart illustrating dependence on concentration of zinc with respect to corrosion speeds of the zinc-containing aluminum-silicon alloy according to Embodiment 3 of the present invention.

As illustrated in FIG. 6, it was observed that, the higher the concentration of the zinc was in the zinc-containing aluminum-silicon alloy, the higher was the corrosion speed.

Also, as for the values thereof, it was observed that when the concentration of the zinc exceeded 15 wt %, the corrosion speed exceeded a tolerance range of 1 μg/h×cm². As the concentration of the zinc in the zinc-containing aluminum-silicon alloy increases, the corrosion speed increases. In other words, it was observed that, to form the zinc-containing aluminum-silicon alloy layer on the surface of the refrigerant distributor 1, it is necessary to control the concentration of the zinc at a predetermined level, because disappearance of the sacrifice positive electrode layer is accelerated by the corrosion.

As explained above, as a result of evaluating the impacts made on the thermodynamic characteristics (the melting points) and the corrosion resistance by the concentration of the zinc contained in the zinc-containing aluminum-silicon alloy, it was observed that it is necessary to control the concentration of the zinc to be in an optimal range. More specifically, it is preferable to control the concentration of the zinc to be in the range from 5 wt % to 15 wt % inclusive of the zinc-containing aluminum-silicon alloy. In other words, when the concentration of the zinc contained in the zinc-containing aluminum-silicon alloy brazing material 8 is 5 wt % or higher, it is possible to have a temperature difference during the heating process because the melting point of the zinc-containing aluminum-silicon alloy brazing material 8 is certainly lower than the melting point of the aluminum-silicon alloy brazing material 9. Further, when the concentration of the zinc in the zinc-containing aluminum-silicon alloy brazing material 8 is 15 wt % or lower, it is possible to ensure the corrosion resistance because the corrosion speed does not exceed the tolerance range of 1 μg/h×cm². As explained herein, because the concentration of the zinc in the zinc-containing aluminum-silicon alloy brazing material 8 is limited to the optimal range, it is possible to form the sacrifice positive electrode layer 11 by performing the heating process on the zinc-containing aluminum-silicon alloy brazing material 8 after the joining process is performed while using the aluminum-silicon alloy brazing material 9. Consequently, it is possible to inhibit the occurrence of re-melting, erosion, and other phenomena in the surroundings of the joined parts and to also ensure the corrosion resistance of the refrigerant distributor 1.

Embodiment 4

In the present embodiment, a refrigerant distributor manufacturing apparatus 300 and a manufacturing method for manufacturing the refrigerant distributor 1 by using the same will be explained, the refrigerant distributor manufacturing apparatus 300 being configured to join the inflow section 5 of the distributing section 3 with the refrigerant pipe 4 serving as an inflow pipe and, either at the same time as or subsequent to the joining of the outflow sections 3b with the outflow pipes 2, configured to form the sacrifice positive electrode layer 11 in the vicinity of the outflow sections 3b, which is where the thickness is smallest within the distributing section 3, i.e., where the corrosion resistance should be ensured.

Figure 7:
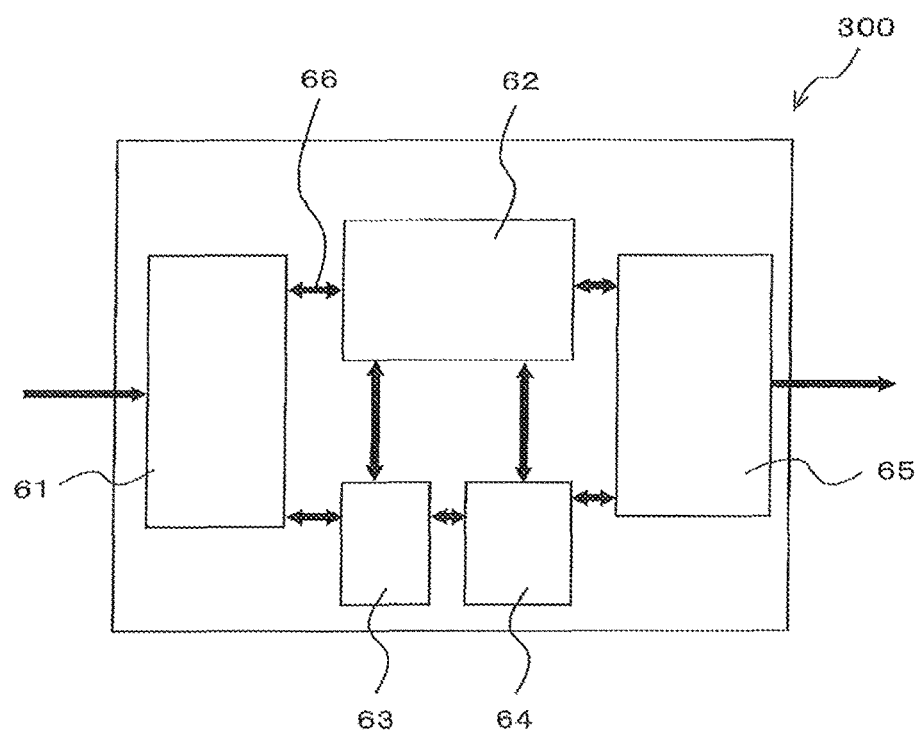
FIG. 7 is a drawing that illustrates a refrigerant distributor manufacturing apparatus used for forming a sacrifice positive electrode layer on a surface of a refrigerant distributor according to Embodiment 4 of the present invention.

FIG. 7 is a drawing that illustrates the refrigerant distributor manufacturing apparatus 300 used for forming the sacrifice positive electrode layer 11 on the surface of the refrigerant distributor 1 according to Embodiment 4 of the present invention.

As illustrated in FIG. 7, the refrigerant distributor manufacturing apparatus 300 includes: an applying unit 61 to perform an applying process; an alloy disposing unit 62 to dispose the zinc-containing aluminum-silicon alloy brazing material 8; an inserting unit 63 to insert the outflow pipes 2 into the outflow sections 3b of the refrigerant distributor 1; a brazing material disposing unit 64 to dispose the aluminum-silicon alloy brazing material 9; and a heating unit 65 that is configured to form the sacrifice positive electrode layer 11 for the refrigerant distributor 1, that includes a heating member, and is configured to braze the outflow pipes 2 with the outflow sections 3b of the refrigerant distributor 1. The applying unit 61, the alloy disposing unit 62, the inserting unit 63, the brazing material disposing unit 64, and the heating unit 65 are connected together by a line 66. The line 66 makes it possible for the other constituent members of the refrigerant distributor 1 to travel between these units.

To manufacture the refrigerant distributor 1, an aluminum-manganese based alloy, A3003, is used as the aluminum material for the distributing section 3, the refrigerant pipe 4 serving as an inflow pipe, and the outflow pipes 2. Other examples of the aluminum material that can be used include A1000-series alloys (A1050, A1070, and so on) containing pure aluminum; A5000-series alloys (A5052 and so on) which are aluminum-magnesium alloys; and A6000-series alloys (A6063 and so on) which are aluminum-magnesium-silicon alloys. The details of the zinc-containing aluminum-silicon alloy brazing material used for forming the sacrifice positive electrode layer as well as the flux and the aluminum-silicon alloy brazing material used for the brazing process are the same as those in Embodiment 1. The explanation thereof will therefore be omitted.

As illustrated in FIG. 7, the applying unit 61 filled with the flux 7 serving as a solvent applies the flux 7 to the surface of the distributing section 3 and the outflow sections 3b of the refrigerant distributor 1.

The alloy disposing unit 62 disposes the zinc-containing aluminum-silicon alloy brazing material 8 at the basal end of the outflow sections 3b of the refrigerant distributor 1 to which the flux 7 has been applied. As for the method for disposing the zinc-containing aluminum-silicon alloy brazing material 8, it is necessary to design the procedure so that the sacrifice positive electrode layer 11 is formed on the surface of the outflow sections 3b and the distributing section 3. The details will be explained as Embodiment 5.

By employing the heating member, the heating unit 65 of the refrigerant distributor manufacturing apparatus 300 heats the refrigerant distributor 1 to which the flux 7 has been applied and for which the zinc-containing aluminum-silicon alloy brazing material 8 has been disposed. As a result, the sacrifice positive electrode layer 11 is formed on the surface of the outflow sections 3b and the distributing section 3 of the refrigerant distributor 1.

Further, the applying unit 61 filled with the flux 7 serving as a solvent similarly applies the flux 7 to the surface corresponding to a fitted part where the outflow sections 3b of the refrigerant distributor 1 and the outflow pipes 2 are fitted together.

The inserting unit 63 fits the outflow sections 3b of the refrigerant distributor 1 and the outflow pipes 2 together to which the flux 7 has been applied on the surface thereof. The brazing material disposing unit 56 disposes the aluminum-silicon alloy brazing material 9 at the fitted part between the outflow pipes 2 and the outflow sections 3b of the refrigerant distributor 1.

The outflow pipes 2 and the outflow sections 3b of the refrigerant distributor 1 are brazed together, as a result of a heating process by the heating unit 65 included in the refrigerant distributor manufacturing apparatus 300 that is performed, while employing the heating member, on the refrigerant distributor 1 to which the flux 7 has been applied and for which the aluminum-silicon alloy brazing material 9 has been disposed.

The order in which the step of forming the sacrifice positive electrode layer 11 using the zinc-containing aluminum-silicon alloy brazing material 8 and the step of performing the brazing process using the aluminum-silicon alloy brazing material 9 are performed will be explained.

As explained in Embodiment 1 with reference to FIGS. 4A to 4D, the melting point of the zinc-containing aluminum-silicon alloy brazing material 8 is lower than that of the aluminum-silicon alloy brazing material 9. Accordingly, the zinc component diffuses as the sacrifice positive electrode layer 11 in the direction toward the core material of the refrigerant distributor 1 at a temperature lower than the temperature used for the brazing process. Consequently, it is preferable to perform the step of forming the sacrifice positive electrode layer 11 either at the same time as or after the brazing step. When using one of these orders, there is no possibility for an exposure to a temperature higher than the melting point of the aluminum-silicon alloy brazing material 9, while the sacrifice positive electrode layer 11 is formed. It is therefore possible to form the sacrifice positive electrode layer 11 also on the brazing material layer. As explained herein, it is possible to manufacture the refrigerant distributor 1 having the sacrifice positive electrode layer formed thereon, while ensuring that the brazing process performed on the outflow pipes 2 and the outflow sections 3b is stable.

Figure 8A:
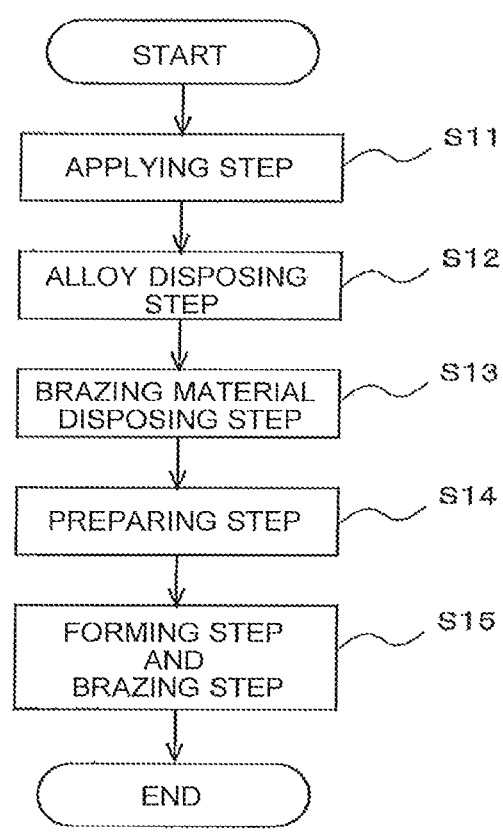
FIG. 8A is a flowchart illustrating a method for manufacturing a refrigerant distributor to form a sacrifice positive electrode layer on a surface of a refrigerant distributor according to Embodiment 4 of the present invention.
Figure 8B:
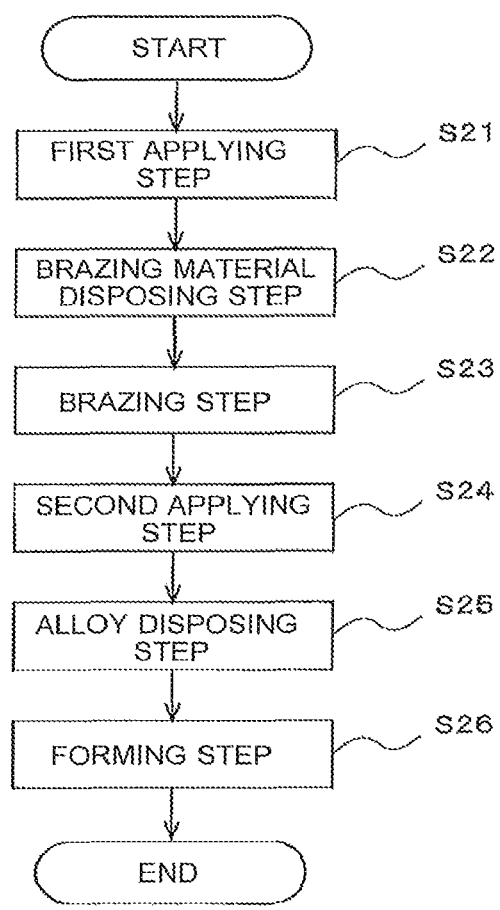
FIG. 8B is a flowchart illustrating another method for manufacturing a refrigerant distributor to form a sacrifice positive electrode layer on a surface of a refrigerant distributor according to Embodiment 4 of the present invention.

FIG. 8A is a flowchart illustrating a method for manufacturing the refrigerant distributor 1 to form the sacrifice positive electrode layer 11 on the surface of the refrigerant distributor 1 according to Embodiment 4 of the present invention. FIG. 8B is a flowchart illustrating another method for manufacturing the refrigerant distributor 1 to form the sacrifice positive electrode layer 11 on the surface of the refrigerant distributor 1 according to Embodiment 4 of the present invention.

According to the example of the method for manufacturing the refrigerant distributor 1 illustrated in FIG. 8A, in an applying step in step S11, the refrigerant distributor manufacturing apparatus 300 applies the flux 7 to the surface corresponding to the fitted part of the outflow sections 3b of the refrigerant distributor 1 and the outflow pipes 2, by employing the applying unit 61 filled with the flux 7 serving as a solvent. Further, the refrigerant distributor manufacturing apparatus 300 applies the flux 7 to the surface of the distributing section 3 and the outflow sections 3b of the refrigerant distributor 1.

In an alloy disposing step in step S12, the refrigerant distributor manufacturing apparatus 300 disposes, by employing the alloy disposing unit 62, the zinc-containing aluminum-silicon alloy brazing material 8 at the basal end of the outflow sections 3b of the refrigerant distributor 1 to which the flux 7 has been applied.

In a brazing material disposing step in step S13, by employing the inserting unit 63, the refrigerant distributor manufacturing apparatus 300 fits together the outflow sections 3b of the refrigerant distributor 1 and the outflow pipes 2 to which the flux 7 has been applied on the surface thereof. Further, by employing the brazing material disposing unit 56, the refrigerant distributor manufacturing apparatus 300 disposes the aluminum-silicon alloy brazing material 9 at the fitted part between the outflow pipes 2 and the outflow sections 3b of the refrigerant distributor 1.

In a preparing step in step S14, the refrigerant distributor manufacturing apparatus 300 prepares the heating unit 65 configured to heat the zinc-containing aluminum-silicon alloy brazing material 8 and the aluminum-silicon alloy brazing material 9, so that a burner brazer serving as the heating member is able to perform a heating process.

In a forming step and a brazing step in step S15, the refrigerant distributor manufacturing apparatus 300 performs a brazing process on the outflow pipes 2 and the outflow sections 3b of the refrigerant distributor 1, as a result of a heating process realized by the heating unit 65 through a heating process of the burner brazer serving as the heating member, performed on the refrigerant distributor 1 to which the flux 7 has been applied and for which the aluminum-silicon alloy brazing material 9 has been disposed. At the same time, the refrigerant distributor manufacturing apparatus 300 forms the sacrifice positive electrode layer 11 on the surface of the outflow sections 3b and the distributing section 3 of the refrigerant distributor 1, as a result of a heating process realized by the heating unit 65 through a heating process of the burner brazer serving as the heating member, performed on the refrigerant distributor 1 to which the flux 7 has been applied and for which the zinc-containing aluminum-silicon alloy brazing material 8 has been disposed.

In this situation, as described in Embodiment 1, in the forming step and the brazing step in step S15, the zinc-containing aluminum-silicon alloy brazing material 8 is melted first to be alloyed with the aluminum material 6. After that, the heating process is continued to raise the heating temperature so that the aluminum-silicon alloy brazing material 9 is melted and alloyed with the aluminum material 6.

In this manner, the manufacture of the refrigerant distributor 1 is completed.

In contrast, according to the example of the method for manufacturing the refrigerant distributor 1 illustrated in FIG. 8B, in a first applying step in step S21, the refrigerant distributor manufacturing apparatus 300 applies the flux 7 to the surface corresponding to the fitted part of the outflow sections 3b of the refrigerant distributor 1 and the outflow pipes 2, by employing the applying unit 61 filled with the flux 7 serving as a solvent.

In a brazing material disposing step in step S22, by employing the inserting unit 63, the refrigerant distributor manufacturing apparatus 300 fits together the outflow sections 3b of the refrigerant distributor 1 and the outflow pipes 2 to which the flux 7 has been applied on the surface thereof. Also, by employing the brazing material disposing unit 56, the refrigerant distributor manufacturing apparatus 300 disposes the aluminum-silicon alloy brazing material 9 at the fitted part between the outflow pipes 2 and the outflow sections 3b of the refrigerant distributor 1.

In a brazing step in step S23, the refrigerant distributor manufacturing apparatus 300 performs a brazing process on the outflow pipes 2 and the outflow sections 3b of the refrigerant distributor 1, as a result of a heating process realized by the heating unit 65 through a heating process of the burner brazer serving as the heating member, performed on the refrigerant distributor 1 to which the flux 7 has been applied and for which the aluminum-silicon alloy brazing material 9 has been disposed.

In a second applying step in step S24, the refrigerant distributor manufacturing apparatus 300 applies the flux 7 to the surface of the distributing section 3 and the outflow sections 3b of the refrigerant distributor 1, by employing the applying unit 61 filled with the flux 7 serving as a solvent.

In an alloy disposing step in step S25, by employing the alloy disposing unit 62, the refrigerant distributor manufacturing apparatus 300 disposes the zinc-containing aluminum-silicon alloy brazing material 8 at the basal end of the outflow sections 3b of the refrigerant distributor 1 to which the flux 7 has been applied.

In a forming step in step S26, the refrigerant distributor manufacturing apparatus 300 forms the sacrifice positive electrode layer 11 on the surface of the outflow sections 3b and the distributing section 3 of the refrigerant distributor 1, as a result of a heating process realized by the heating unit 65 through a heating process of the burner brazer serving as the heating member, performed on the refrigerant distributor 1 to which the flux 7 has been applied and for which the zinc-containing aluminum-silicon alloy brazing material 8 has been disposed.

In this situation, in the forming step in step S26, the heating temperature is lower than that in the brazing step in step S23, as explained in Embodiment 2. In other words, the heating process is performed up to a temperature at which the aluminum-silicon alloy brazing material 9 is not melted, but only the zinc-containing aluminum-silicon alloy brazing material 8 is melted.

In this manner, the manufacture of the refrigerant distributor 1 is completed.

Embodiment 5

To manufacture the refrigerant distributor 1 according to Embodiment 4, the inner and outer circumferences of the outflow sections 3b of the refrigerant distributor 1 are selected as the locations in which the zinc-containing aluminum-silicon alloy brazing material 8 is disposed. However, it is also effective to carry out another embodiment regarding disposing methods. With the refrigerant distributor 1 according to Embodiment 5, an effective method for disposing the zinc-containing aluminum-silicon alloy brazing material 8 to form the sacrifice positive electrode layer 11 will be explained.

To form the sacrifice positive electrode layer 11 on the surface of the refrigerant distributor 1, locations which may be difficult to be addressed with the zinc thermal spraying method described above are, in the example of the refrigerant distributor 1 of the present embodiment, the basal end part of the outflow sections 3b and the inner core side of the outflow sections 3b.

By implementing the method for disposing the zinc-containing aluminum-silicon alloy brazing material 8 according to the present embodiment, it is possible to efficiently and accurately form the sacrifice positive electrode layer 11 on the surface of these parts.

Figure 9A:
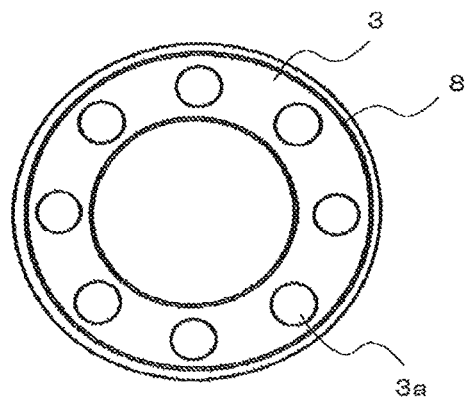
FIG. 9A is a drawing illustrating a method for disposing a zinc-containing aluminum-silicon alloy to form a sacrifice positive electrode layer on a surface of a refrigerant distributor according to Embodiment 5 of the present invention.
Figure 9B:
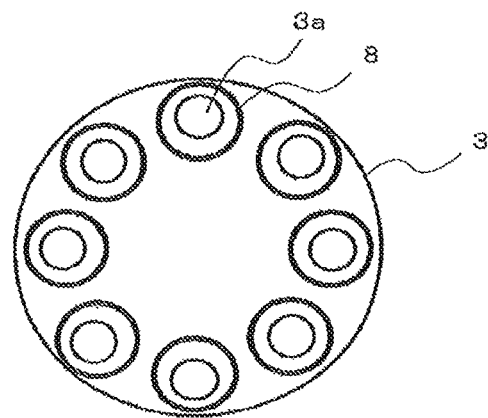
FIG. 9B is a drawing illustrating another method for disposing the zinc-containing aluminum-silicon alloy to form the sacrifice positive electrode layer on the surface of the refrigerant distributor according to Embodiment 5 of the present invention.
Figure 9C:
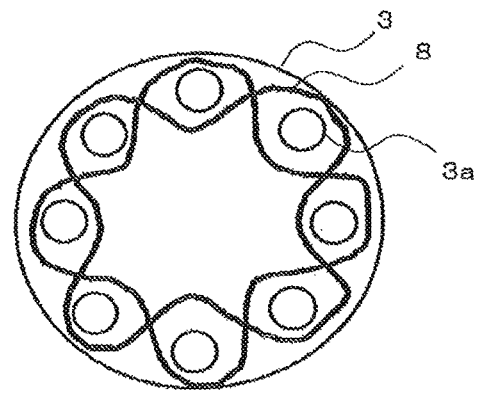
FIG. 9C is a drawing illustrating yet another method for disposing the zinc-containing aluminum-silicon alloy to form the sacrifice positive electrode layer on the surface of the refrigerant distributor according to Embodiment 5 of the present invention.

FIG. 9A is a drawing illustrating a method for disposing the zinc-containing aluminum-silicon alloy brazing material 8 to form the sacrifice positive electrode layer 11 on the surface of the refrigerant distributor 1. FIG. 9B is a drawing illustrating another method for disposing the zinc-containing aluminum-silicon alloy brazing material 8 to form the sacrifice positive electrode layer 11 on the surface of the refrigerant distributor 1. FIG. 9C is a drawing illustrating yet another method for disposing the zinc-containing aluminum-silicon alloy brazing material 8 to form the sacrifice positive electrode layer 11 on the surface of the refrigerant distributor 1.

More specifically, it is desirable to dispose the zinc-containing aluminum-silicon alloy brazing material 8 that is in a wire form, in a formation illustrated in any one of FIGS. 9A to 9C. In each of FIGS. 9A to 9C, the refrigerant distributor 1 is projected from the side of the outflow sections 3b.

The methods for disposing the zinc-containing aluminum-silicon alloy brazing material 8 for the refrigerant distributor 1 will be explained.

In the example in FIG. 9A, the material is disposed on the inside and the outside of the plurality of outflow sections 3b of the refrigerant distributor 1 in circular formations. With this arrangement, it is possible to efficiently and accurately form the sacrifice positive electrode layer 11 in a surrounding area centered about the outflow sections 3b.

In the example in FIG. 9B, the material is disposed at the basal end of each of the outflow sections 3b of the refrigerant distributor 1 in circular formations or horseshoe formations (not illustrated). With this arrangement also, it is possible to achieve the same advantageous effect as that of the example in FIG. 9A.

In the example in FIG. 9C, two strips of the zinc-containing aluminum-silicon alloy brazing material 8 each being in a single-line meandering endless formation are disposed, while being out of alignment with each other, at the basal end of the outflow sections 3b of the refrigerant distributor 1. With this arrangement also, it is possible to achieve the same advantageous effect as that of the example in FIG. 9A.

By using any of these disposing methods, when the refrigerant distributor 1 having a sacrifice positive electrode layer formed thereon and being manufactured by the refrigerant distributor manufacturing apparatus 300 was inspected, it was observed that the sacrifice positive electrode layer 11 was formed in an excellent manner on the surface of the outflow sections 3b and the distributing section 3 while uniformly diffusing in the surface layer direction and the depth direction.

Embodiment 6

In the methods for manufacturing the refrigerant distributor 1 according to Embodiments 1 to 5, the flux 7 to remove the aluminum oxide from the surface thereof is applied in advance, for the purpose of melting the zinc-containing aluminum-silicon alloy brazing material 8 or the aluminum-silicon alloy brazing material 9 to be alloyed with the refrigerant distributor 1, the outflow pipes 2, or the plurality of outflow sections 3b. However, another method is also effective by which the flux 7 is arranged in advance to be supported on these alloy brazing materials, so that a brazing and heating process is performed by disposing the flux-supporting alloy brazing material for the refrigerant distributor 1, the outflow pipes 2, or the plurality of outflow sections 3b with which the alloying process is expected to take place. In the present embodiment, a method for manufacturing the refrigerant distributor 1 by using the alloy brazing material arranged in advance to support the flux 7 will be explained.

This procedure uses the zinc-containing aluminum-silicon alloy brazing material 8 or the aluminum-silicon alloy brazing material 9 to which the flux 7 serving as a solvent is applied in advance on the surface thereof. The zinc-containing aluminum-silicon alloy brazing material 8 to which the flux 7 has been applied is disposed by implementing any of the disposing methods described in Embodiment 5. Further, the aluminum-silicon alloy brazing material 9 to which the flux 7 has been applied is disposed in a ring formation at such a part where the plurality of outflow pipes 2 and the plurality of outflow sections 3b are fitted together, respectively.

A brazing and heating process is performed on the refrigerant distributor 1, the outflow pipes 2, the zinc-containing aluminum-silicon alloy brazing material 8, and the aluminum-silicon alloy brazing material 9 that are combined together in this manner. By the heating process, the zinc-containing aluminum-silicon alloy brazing material 8 is melted first, together with the flux 7. Subsequently, the aluminum-silicon alloy brazing material 8 is melted together with the flux 7. As a result, the flux 7 removes the aluminum oxide formed on the surface of the refrigerant distributor 1, the outflow pipes 2, and the outflow sections 3b, to ensure wettability and fluidity of the brazing material on the surface. On the surface where the wettability and the fluidity of the brazing material are ensured, the aluminum base material and the aluminum alloy brazing material are alloyed together, so that a sacrifice positive electrode layer forming process and a brazing and joining process are each performed.

When the refrigerant distributor 1 having a sacrifice positive electrode layer formed thereon and being manufactured by the refrigerant distributor manufacturing apparatus 300 according to Embodiment 4 while using these materials and the manufacturing step described above was inspected, it was observed that the sacrifice positive electrode layer 11 was formed in an excellent manner on the surface of the outflow sections 3b and the distributing section 3 while uniformly diffusing in the surface layer direction and the depth direction. Further, it was also observed that the plurality of outflow pipes 2 and the outflow sections 3b are joined together in an excellent manner by the aluminum-silicon alloy brazing material 9. By employing the applying unit 61, the refrigerant distributor manufacturing apparatus 300 applies the flux 7 to remove the aluminum oxide, to the surface of the zinc-containing aluminum-silicon alloy brazing material 8 and the aluminum-silicon alloy brazing material 9.

By using an example of the method for manufacturing the refrigerant distributor 1 according to Embodiment 6, the sacrifice positive electrode layer 11 is formed by disposing and heating the zinc-containing aluminum-silicon alloy brazing material 8 to which the flux 7 has been applied. Accordingly, there is no need to apply the flux 7 to fit the complicated shapes of the outflow sections 3b. There is no need to apply the aluminum-silicon alloy brazing material 9 to fit the complicated shapes of the outflow sections 3b, either. Consequently, it is possible to form the sacrifice positive electrode layer conveniently, efficiently, and accurately, on the surface of the refrigerant distributor having a complicated shape.

As explained above, according to the present embodiment, it is understood that the sacrifice positive electrode layer and the brazed joined parts are formed in an excellent manner, by manufacturing the refrigerant distributor 1 with the use of the zinc-containing aluminum-silicon alloy brazing material 8 and the aluminum-silicon alloy brazing material 9 arranged in advance to support the flux 7 on the surface thereof.

In Embodiments 1 to 6 described above, according to one of the methods for manufacturing the refrigerant distributor 1, manufactured is the refrigerant distributor 1 including: the inflow section 5 into which the refrigerant enters from the refrigerant pipe 4 serving as an inflow pipe and that is made of aluminum, the plurality of outflow pipes 2 each of which allows the entering refrigerant to flow out and each of which is made of aluminum, and the distributing section 3 that includes the plurality of outflow sections 3b each being connected to a different one of the plurality of outflow pipes 2 and that is made of aluminum. The method for manufacturing the refrigerant distributor 1 includes an applying step of applying flux 7 to remove an aluminum oxide to a surface of the plurality of outflow sections 3b and the distributing section 3. The method includes an alloy disposing step of disposing the zinc-containing aluminum-silicon alloy brazing material 8 on the surface to which the flux is applied. The method includes a forming step of forming the sacrifice positive electrode layer 11 on the surface by heating the disposed zinc-containing aluminum-silicon alloy brazing material 8. The method includes a brazing material disposing step of inserting the plurality of outflow pipes 2 into the plurality of outflow sections 3b, respectively, and disposing the aluminum-silicon alloy brazing material 9 on the surface of the outflow sections 3b. The method includes a brazing step of brazing the plurality of outflow sections 3b with the plurality of outflow pipes 2, respectively, by heating the disposed aluminum-silicon alloy brazing material 9.

By using this configuration, it is possible to form the sacrifice positive electrode layer 11 conveniently, efficiently, and accurately, on the surface of the refrigerant distributor 1 having a complicated shape. Further, it is possible to prevent the strength in the surroundings of the joined parts from being lowered by excessive heating during the formation of the sacrifice positive electrode layer 11.

According to a method for manufacturing the refrigerant distributor 1, manufactured is the refrigerant distributor 1 including: the inflow section 5 into which refrigerant enters from the refrigerant pipe 4 serving as an inflow pipe and that is made of aluminum; the plurality of outflow pipes 2 each of which allows the entering refrigerant to flow out and each of which is made of aluminum; and the distributing section 3 that includes the plurality of outflow sections 3b each being connected to a different one of the plurality of outflow pipes 2 and that is made of aluminum. The method for manufacturing the refrigerant distributor 1 includes an applying step of applying the flux 7 to remove an aluminum oxide to a surface of the zinc-containing aluminum-silicon alloy brazing material 8. The method includes an alloy disposing step of disposing the zinc-containing aluminum-silicon alloy brazing material 8 to which the flux 7 is applied in advance on the surface thereof, at the outflow sections 3b and the distributing section 3. The method includes a forming step of forming a sacrifice positive electrode layer on a surface of the outflow sections 3b and the distributing section 3 by heating the disposed zinc-containing aluminum-silicon alloy brazing material 8. The method includes a brazing material disposing step of inserting the plurality of outflow pipes 2 into the plurality of outflow sections 3b, respectively, and disposing the aluminum-silicon alloy brazing material 9 to which the flux is applied in advance on a surface thereof, at the outflow sections 3b. The method includes a brazing step of brazing the plurality of outflow sections 3b with the plurality of outflow pipes 2, respectively, by heating the disposed aluminum-silicon alloy brazing material 9.

By using this configuration, the sacrifice positive electrode layer 11 is formed by disposing and heating the zinc-containing aluminum-silicon alloy brazing material 8 to which the flux 7 has been applied. There is no need to apply the flux 7 to fit the complicated shapes of the outflow sections 3b. There is no need to apply the aluminum-silicon alloy brazing material 9 to fit the complicated shapes of the outflow sections 3b, either. Accordingly, it is possible to form the sacrifice positive electrode layer 11 conveniently, efficiently, and accurately, on the surface of the refrigerant distributor 1 having a complicated shape. Further, it is possible to prevent the strength in the surroundings of the joined parts from being lowered by excessive heating during the formation of the sacrifice positive electrode layer 11.

A refrigerant distributor manufacturing method includes a preparing step of preparing a heating member configured to heat the refrigerant distributor. The heating process performed in the forming step and the heating process performed in the brazing step are performed simultaneously by using the heating member prepared in the preparing step.

By using this configuration, it is possible to keep small the number of manufacturing steps for the refrigerant distributor 1. It is therefore possible to improve efficiency of the manufacture.

According to a refrigerant distributor manufacturing method, the forming step is performed after the brazing step.

By using this configuration, it is possible to form the sacrifice positive electrode layer 11 on the surface of the refrigerant distributor 1 in which the outflow pipes 2 and the outflow sections 3b are brazed and joined together in advance due to constraints in the manufacturing process.

The refrigerant distributor manufacturing apparatus 300 manufactures the refrigerant distributor 1 including: the inflow section 5 into which refrigerant enters from the refrigerant pipe 4 serving as an inflow pipe and that is made of aluminum; the plurality of outflow pipes 2 each of which allows the entering refrigerant to flow out and each of which is made of aluminum; and the distributing section 3 that includes the plurality of outflow sections 3b each being connected to a different one of the plurality of outflow pipes 2 and that is made of aluminum. The refrigerant distributor manufacturing apparatus 300 includes the applying unit 61 to apply the flux 7 that removes an aluminum oxide to a surface of the plurality of outflow sections 3b and the distributing section 3. The device includes the alloy disposing unit 62 to dispose the zinc-containing aluminum-silicon alloy brazing material 8 on the surface to which the flux is applied by the applying unit 61. The device includes the inserting unit 63 to insert the plurality of outflow pipes 2 into the plurality of outflow sections 3b, respectively. The device includes the brazing material disposing unit 64 to dispose the aluminum-silicon alloy brazing material 9 at the plurality of outflow sections 3b into which the plurality of outflow pipes 2 are inserted, respectively, by the inserting unit 63. The device includes the heating unit 65 to perform a forming step of forming the sacrifice positive electrode layer 11 on the surface by heating the zinc-containing aluminum-silicon alloy brazing material 8 disposed by the alloy disposing unit 62 and a brazing step of brazing the plurality of outflow sections 3b with the plurality of outflow pipes 2, respectively, by heating the aluminum-silicon alloy brazing material 9 disposed by the brazing material disposing unit 64.

By using this configuration, it is possible to form the sacrifice positive electrode layer 11 conveniently, efficiently, and accurately, on the surface of the refrigerant distributor 1 having a complicated shape. Further, it is possible to prevent the strength in the surroundings of the joined parts from being lowered by excessive heating during the formation of the sacrifice positive electrode layer 11.

The refrigerant distributor manufacturing apparatus 300 manufactures the refrigerant distributor 1 including: the inflow section 5 into which refrigerant enters from the refrigerant pipe 4 serving as an inflow pipe and that is made of aluminum; the plurality of outflow pipes 2 each of which allows the entering refrigerant to flow out and each of which is made of aluminum; and the distributing section 3 that includes the plurality of outflow sections 3b each being connected to a different one of the plurality of outflow pipes 2 and that is made of aluminum. The refrigerant distributor manufacturing apparatus 300 includes the applying unit 61 to apply the flux 7 that removes an aluminum oxide to surfaces of the zinc-containing aluminum-silicon alloy brazing material 8 and the aluminum-silicon alloy brazing material 9. The device includes the alloy disposing unit 62 to dispose the zinc-containing aluminum-silicon alloy brazing material 8 to which the flux is applied by the applying unit 61, at the outflow sections 3b and the distributing section 3. The device includes the inserting unit 63 to insert the plurality of outflow pipes 2 into the plurality of outflow sections 3b, respectively. The device includes the brazing material disposing unit 64 to dispose the aluminum-silicon alloy brazing material 9 to which the flux is applied by the applying unit 61, at the plurality of outflow sections 3b into which the plurality of outflow pipes 2 are inserted, respectively, by the inserting unit 63. The device includes the heating unit 65 to perform: a forming step of forming a sacrifice positive electrode layer on a surface of the plurality of outflow sections 3b and the distributing section 3 by heating the zinc-containing aluminum-silicon alloy brazing material 8 disposed by the alloy disposing unit 62; and a brazing step of brazing the plurality of outflow sections 3b with the plurality of outflow pipes 2, respectively, by heating the aluminum-silicon alloy brazing material 9 disposed by the brazing material disposing unit 64.

By using this configuration, the sacrifice positive electrode layer 11 is formed by disposing and heating the zinc-containing aluminum-silicon alloy brazing material 8 to which the flux 7 has been applied. There is no need to apply the flux 7 to fit the complicated shapes of the outflow sections 3b. There is no need to apply the aluminum-silicon alloy brazing material 9 to fit the complicated shapes of the outflow sections 3b, either. Accordingly, it is possible to form the sacrifice positive electrode layer 11 conveniently, efficiently, and accurately, on the surface of the refrigerant distributor 1 having a complicated shape. Further, it is possible to prevent the strength in the surroundings of the joined parts from being lowered by excessive heating during the formation of the sacrifice positive electrode layer 11.

The heating unit 65 includes a heating member to heat the refrigerant distributor 1 and performs the forming step and the brazing step simultaneously by employing the heating member.

By using this configuration, it is possible to keep small the number of manufacturing steps for the refrigerant distributor 1. It is therefore possible to improve efficiency of the manufacture.

The heating unit 65 may perform the forming step after the brazing step.

By using this configuration, it is possible to form the sacrifice positive electrode layer 11 on the surface of the refrigerant distributor 1 in which, due to constraints in the manufacture process, the outflow pipes 2 and the outflow sections 3b are joined together in advance by a brazing process.

The refrigerant distributor 1 includes the inflow section 5 into which refrigerant enters from the refrigerant pipe 4 serving as an inflow pipe and that is made of aluminum. The refrigerant distributor 1 includes the plurality of outflow pipes 2 each of which allows the entering refrigerant to flow out and each of which is made of aluminum. The refrigerant distributor 1 includes the distributing section 3 that includes the plurality of outflow sections 3b each being connected to a different one of the plurality of outflow pipes 2 and that is made of aluminum. The refrigerant distributor 1 includes an aluminum-silicon alloy brazing material section in which the plurality of outflow pipes 2 and the plurality of outflow sections 3b are joined together. The refrigerant distributor 1 includes the sacrifice positive electrode layer 11 being formed on a surface of the plurality of outflow sections 3b and the distributing section 3 and having the zinc-containing aluminum-silicon alloy brazing material 8 in which a concentration of zinc is higher than that in the aluminum-silicon alloy brazing material 9 and which is electrochemically more unstable than the aluminum-silicon alloy brazing material 9.

By using this configuration, the sacrifice positive electrode layer 11 is formed conveniently, efficiently, and accurately, on the surface of the refrigerant distributor 1 having a complicated shape. Further, the strength in the surroundings of the joined parts is prevented from being lowered by excessive heating during the formation of the sacrifice positive electrode layer 11.

The concentration of zinc in the zinc-containing aluminum-silicon alloy brazing material 8 with respect to the alloy is in a range from 5 wt % to 15 wt % inclusive.

By using this configuration, when the concentration of the zinc in the zinc-containing aluminum-silicon alloy brazing material 8 is 5 wt % or higher, it is possible to have a temperature difference during the heating process, because the melting point of the zinc-containing aluminum-silicon alloy brazing material 8 is certainly lower than the melting point of the aluminum-silicon alloy brazing material 9. Further, when the concentration of the zinc in the zinc-containing aluminum-silicon alloy brazing material 8 is 15 wt % or lower, it is possible to ensure the corrosion resistance, because the corrosion speed does not exceed the tolerance range of 1 μg/h×cm².

The aluminum-silicon alloy brazing material section and the sacrifice positive electrode layer 11 are positioned adjacent to each other.

By using this configuration, it is possible to form the aluminum-silicon alloy brazing material section and the sacrifice positive electrode layer 11 simultaneously.

The outdoor heat exchanger 100 includes: the refrigerant distributor 1; the plurality of heat transfer tubes 50 extending from the refrigerant distributor 1; and the plurality of fins 51.

By using this configuration, it is possible to provide the refrigerant distributor 1 which, although having a complicated shape, has formed on the surface thereof the sacrifice positive electrode layer 11 conveniently, efficiently, and accurately. Further, it is possible to provide the refrigerant distributor 1 in which the strength in the surroundings of the joined parts is prevented from being lowered by excessive heating during the formation of the sacrifice positive electrode layer 11.

The air-conditioning apparatus 200 includes: the compressor 201; the outdoor heat exchanger 100; the electronic expansion valve 207; the indoor heat exchanger 209; and the refrigerant distributor 1. The refrigerant distributor 1 distributes the refrigerant to the plurality of heat transfer tubes 50 of the outdoor heat exchanger 100.

By using this configuration, it is possible to provide the refrigerant distributor 1 which, although having a complicated shape, has formed on the surface thereof the sacrifice positive electrode layer 11 conveniently, efficiently, and accurately. Further, it is possible to provide the refrigerant distributor 1 in which the strength in the surroundings of the joined parts is prevented from being lowered by excessive heating during the formation of the sacrifice positive electrode layer 11.

In the embodiments described above, the refrigerant distributor 1 is used for the outdoor heat exchanger 100 connected to the outflow pipes 2; however, possible embodiments are not limited to this example. For instance, the refrigerant distributor of any of the embodiments of the present invention may be provided in a refrigerant distributing unit configured to distribute refrigerant to an indoor heat exchanger or to a plurality of outdoor heat exchangers of a multi-type air-conditioning apparatus.

It is expected, to begin with, that the configurations in any of the embodiments described above are used in combination, as appropriate. Although the above embodiments describe the refrigerant distributor 1, the same description also applies to a heat exchanger including the refrigerant distributor 1. Further, for the purpose of enhancing corrosion resistance, it is also possible to form a sacrifice positive electrode layer by using the zinc-containing aluminum-silicon alloy brazing material, on the surface of, not only the refrigerant distributor 1 or a heat exchanger, but also refrigerant passages being made of aluminum and having a complicated shape. Further, the embodiments disclosed herein are merely examples in every aspect and should be regarded as non-restrictive. The scope of the present invention is defined by the claims and not by the description presented above and is intended to include all possible modifications which fall within the meanings and scope of the claims and the equivalents thereof.

REFERENCE SIGNS LIST 1 refrigerant distributor 2 outflow pipes 3 distributing section 3a main body section 3b outflow sections 3c cut-out section 3d guide 4 refrigerant pipe 5 inflow section 5a annular section 5b tubular section 5c cut-out section 6 aluminum material 6a oxide film 7 flux 8 zinc-containing aluminum-silicon alloy brazing material 9 aluminum-silicon alloy brazing material 10 region where a sacrifice positive electrode layer is to be formed 11 sacrifice positive electrode layer 50 heat transfer tubes 51 fins 52 gas header 61 applying unit 62 alloy disposing unit 63 inserting unit 64 brazing material disposing unit 65 heating unit 66 line 100 outdoor heat exchanger 200 air-conditioning apparatus 201 compressor 202 muffler 203 four-way valve 205 capillary pipe 206 strainer 207 electronic expansion valve 208a, 208b stop valve 209 indoor heat exchanger 210 auxiliary muffler 211 controller 300 refrigerant distributor manufacturing apparatus

The invention claimed is:

1. A method for manufacturing a refrigerant distributor, the refrigerant distributor including an inflow section made of aluminum, into which refrigerant enters from an inflow pipe, a plurality of outflow pipes each of which is made of aluminum and each of which allows the entering refrigerant to flow out, and a distributing section made of aluminum, the distributing section including a plurality of outflow sections each being connected to one of the plurality of outflow pipes, the method comprising:

an applying step of applying flux that removes aluminum oxide to a surface of the plurality of outflow sections and the distributing section;

an alloy disposing step of disposing a zinc-containing aluminum-silicon alloy on the surface to which the flux is applied;

a forming step of forming a sacrifice positive electrode layer on the surface by heating the disposed zinc-containing aluminum-silicon alloy;

a brazing material disposing step of inserting the plurality of outflow pipes into the plurality of outflow sections, respectively, and disposing an aluminum-silicon alloy brazing material on the surface of the plurality of outflow sections; and a brazing step of brazing the plurality of outflow sections with the plurality of outflow pipes, respectively, by heating the disposed aluminum-silicon alloy brazing material.

2. A method for manufacturing a refrigerant distributor, the refrigerant distributor including an inflow section made of aluminum, into which refrigerant enters from an inflow pipe, a plurality of outflow pipes each of which is made of aluminum and each of which allows the entering refrigerant to flow out, and a distributing section made of aluminum, the distributing section including a plurality of outflow sections each being connected to one of the plurality of outflow pipes, the method comprising:

an applying step of applying flux to remove aluminum oxide to a surface of a zinc-containing aluminum-silicon alloy;

an alloy disposing step of disposing zinc-containing aluminum-silicon alloy to which the flux is applied in advance on the surface thereof, at the outflow sections and the distributing section;

a forming step of forming a sacrifice positive electrode layer on a surface of the outflow sections and the distributing section by heating the disposed zinc-containing aluminum-silicon alloy;

a brazing material disposing step of inserting the plurality of outflow pipes into the plurality of outflow sections, respectively, and disposing the aluminum-silicon alloy brazing material to which the flux is applied in advance on a surface thereof, at the plurality of outflow sections; and a brazing step of brazing the plurality of outflow sections with the plurality of outflow pipes, respectively, by heating the disposed aluminum-silicon alloy brazing material.

3. The method of claim 1, further comprising a preparing step of preparing a heating member configured to heat the refrigerant distributor, wherein the heating in the forming step and the heating in the brazing step are performed simultaneously by using the heating member prepared in the preparing step.

4. The method of claim 1, wherein
the forming step is performed after the brazing step.

5. A refrigerant distributor manufacturing apparatus configured to manufacture a refrigerant distributor including an inflow section made of aluminum into which refrigerant enters from an inflow pipe, a plurality of outflow pipes each of which is made of aluminum and each of which allows the entering refrigerant to flow out, and a distributing section made of aluminum, the distributing section including a plurality of outflow sections each being connected to one of the plurality of outflow pipes, the refrigerant distributor manufacturing apparatus comprising:

an applying unit configured to apply flux that removes aluminum oxide to a surface of the plurality of outflow sections and the distributing section;

an alloy disposing unit configured to dispose a zinc-containing aluminum-silicon alloy on the surface to which the flux is applied by the applying unit;

an inserting unit configured to insert the plurality of outflow pipes into the plurality of outflow sections, respectively;

a brazing material disposing unit configured to dispose an aluminum-silicon alloy brazing material at the plurality of outflow sections into which the plurality of outflow pipes are inserted, respectively, by the inserting unit; and a heating unit configured to perform a forming step of forming a sacrifice positive electrode layer on the surface by heating the zinc-containing aluminum-silicon alloy disposed by the alloy disposing unit and a brazing step of brazing the plurality of outflow sections with the plurality of outflow pipes, respectively, by heating the aluminum-silicon alloy brazing material disposed by the brazing material disposing unit.

6. A refrigerant distributor manufacturing apparatus configured to manufacture a refrigerant distributor including an inflow section made of aluminum, into which refrigerant enters from an inflow pipe, a plurality of outflow pipes each of which is made of aluminum and each of which allows the entering refrigerant to flow out, and a distributing section made of aluminum, the distributing section including a plurality of outflow sections each being connected to one of the plurality of outflow pipes, the refrigerant distributor manufacturing apparatus comprising:

an applying unit configured to apply flux that removes an aluminum oxide to surfaces of a zinc-containing aluminum-silicon alloy and an aluminum-silicon alloy brazing material;

an alloy disposing unit configured to dispose the zinc-containing aluminum-silicon alloy to which the flux is applied by the applying unit, at the plurality of outflow sections and the distributing section;

an inserting unit configured to insert the plurality of outflow pipes into the plurality of outflow sections, respectively;

a brazing material disposing unit configured to dispose the aluminum-silicon alloy brazing material to which the flux is applied by the applying unit, at the plurality of outflow sections into which the plurality of outflow pipes are inserted, respectively, by the inserting unit; and a heating unit configured to perform a forming step of forming a sacrifice positive electrode layer on a surface of the plurality of outflow sections and the distributing section by heating the zinc-containing aluminum-silicon alloy disposed by the alloy disposing unit, and a brazing step of brazing the plurality of outflow sections with the plurality of outflow pipes, respectively, by heating the aluminum-silicon alloy brazing material disposed by the brazing material disposing unit.

7. The refrigerant distributor manufacturing apparatus of claim 5, wherein the heating unit includes a heating member configured to heat the refrigerant distributor and performs the forming step and the brazing step simultaneously by employing the heating member.

8. The refrigerant distributor manufacturing apparatus of claim 5, wherein the heating unit is configured to perform the forming step after the brazing step.

9. A refrigerant distributor comprising:
an inflow section made of aluminum, into which refrigerant enters from an inflow pipe and;
a plurality of outflow pipes each of which is made of aluminum and each of which allows the entering refrigerant to flow out;
a distributing section made of aluminum, the distributing section including a plurality of outflow sections each being connected to one of the plurality of outflow pipes; and
an aluminum-silicon alloy brazing material section in which the plurality of outflow pipes and the plurality of outflow sections are joined together,
wherein the distribution section includes a sacrifice positive electrode layer having a zinc-containing aluminum-silicon alloy in which a concentration of zinc is higher than that in the aluminum-silicon alloy brazing material and which is electrochemically more unstable than the aluminum-silicon alloy brazing material,
wherein a concentration of zinc in the aluminum-silicon alloy brazing material is greater than 0, and
wherein the distribution section includes a portion made of aluminum, the portion continuous with the sacrifice positive electrode layer.

10. The refrigerant distributor of claim 9, wherein the concentration of zinc in the zinc-containing aluminum-silicon alloy with respect to the alloy is in a range from 5 wt % to 15 wt % inclusive.

11. The refrigerant distributor of claim 9, wherein the aluminum-silicon alloy brazing material section and the sacrifice positive electrode layer are positioned adjacent to each other.

12. A heat exchanger comprising:
the refrigerant distributor of claim 9;
a plurality of heat transfer tubes extending from the refrigerant distributor; and a plurality of fins.

13. An air-conditioning apparatus comprising:
a compressor;
an outdoor heat exchanger;
an electronic expansion valve;
an indoor heat exchanger; and the refrigerant distributor of claim 9, wherein
the refrigerant distributor distributes the refrigerant to a plurality of heat transfer tubes of the outdoor heat exchanger.

* * * * *